United States Patent [19]
Satterfield

[11] Patent Number: 5,717,760
[45] Date of Patent: Feb. 10, 1998

[54] MESSAGE PROTECTION SYSTEM AND METHOD

[75] Inventor: Richard C. Satterfield, Wellesley, Mass.

[73] Assignee: Channel One Communications, Inc., Needham, Mass.

[21] Appl. No.: 336,766

[22] Filed: Nov. 9, 1994

[51] Int. Cl.[6] .................................................. H04L 9/28
[52] U.S. Cl. ................................ 380/28; 380/42; 380/50
[58] Field of Search .................................. 380/42, 44, 46, 380/28, 29, 50, 47, 37

[56] References Cited

U.S. PATENT DOCUMENTS

| | | | |
|---|---|---|---|
| 4,249,180 | 2/1981 | Eberle et al. | 380/50 X |
| 4,441,095 | 4/1984 | Widmer et al. | 380/28 |
| 4,853,962 | 8/1989 | Brockman | 380/44 |
| 5,077,793 | 12/1991 | Falk et al. | 380/28 |
| 5,113,444 | 5/1992 | Vobach | 380/46 X |
| 5,307,412 | 4/1994 | Vobach | 380/46 X |
| 5,412,729 | 5/1995 | Liu | 380/37 |

OTHER PUBLICATIONS

Denning, Dorothy E.R., "CRYPTOGRAPHY AND DATA SECURITY)", Addison-Wesley Publishing Co., 1982, pp. 83–84, 'Running Key Ciphers'.

*Primary Examiner*—Gilberto Barron, Jr.
*Attorney, Agent, or Firm*—Jerry Cohen; Edwin H. Paul

[57] ABSTRACT

An encryption/decryption apparatus that provides at least two masks, each of which is used in logic/mathematic operation with information to be encrypted to preserve confidentiality. The operations include exclusive oring, addition, subtraction. The source of the masks can be any commonly found data, for example, the code of a music CD. In such a manner the sender may tell the receiver in private that the masks are from a particular track on a particular CD, sampled in a particular fashion, using a particular password. The product of the number of elements in each mask need not be greater or equal to the number of elements in the data file being encrypted. Repetition may make the decoding easier for an eavesdropper, but the use of a password character array to control the use and sequencing of each set of encoding mask operations greatly helps in maintaining the confidentiality of the data. The present invention includes use as a one-time-pad and can be implemented on personal computers.

54 Claims, 20 Drawing Sheets

MESSAGE PROTECTION SYSTEM AND METHOD

FIELD OF THE INVENTION

The present invention relates generally to cryptographic systems and methods that protect confidential information, especially where such information is accessible to others, or where a message is transmitted over communication channels where eavesdropping may occur.

BACKGROUND OF THE INVENTION

The need for confidential information to be kept private has existed for many years. But, with the increased use of electronic means to communicate large mounts of information over great distances, especially wireless communications, the ability of others to intercept and receive the message is to be assumed. In addition, eavesdroppers are assumed to have use of powerful computers with which to decipher encrypted messages. Herein, encrypt, encode and encipher are used interchangeably, as are decrypt, decode and decipher. In a related area, large amounts of confidential information are stored in data banks that are available, via telephone, to unauthorized persons. A partial list where confidentiality is needed includes financial, personal, legal, military and commercial information, and, of course, whenever such information is communicated to or accessible by others.

In 1917 Vernan created a telegraphic cipher system (U.S. Pat. No. 1,310,719; issued Jul. 22, 1919) which used the addition of the value of a message character on a paper tape with another character on a looped key tape; the sum of the values was transmitted as the cipher character. It was soon recognized that the security of the method relied on very long key tapes. Later to eliminate excessively long key tapes, Morehouse (1918) connected two Vernan telegraphic machines together employing two separate looped key tapes so that the output of the first modified the output of the second and this combined output encoded the message tape to create an enciphered message. These two loops had non equal lengths such that all the permutations of the characters on one would occur with all the characters on the other. Thus, two shorter tapes could mimic the employment of a single much larger tape. Mauborgne showed that the Morehouse system was cryptographically secure only when the key tape (or the permutation of two tapes) was comparable in length to the clear text to be encrypted and was used only one time—a type of "one time pad" (see below). Any repetition of any kind of the key either within that message or its use to encrypt other messages would compromise the key tape. It was also shown that a cipher text made using an encryption key the same size as the message itself but consisting of coherent text could be broken, but not if the key were a collection of completely random characters. In the 1920's, numerical code groups for diplomatic or military code were disguised by adding to them a large numeric value or key. About 1921 to 1923, Schauffler, Langlotz and Kunze developed for the German diplomatic missions a system consisting of coding sheets (50 sheets per pad) divided into 48 randomly chosen five digit groups distributed in eight lines of six groups each. These pads were produced in sets, one for encoding and one for decoding and were sent to various locations. Once a page was used for a message, it was discarded, hence the term "a one time pad". The one time full length random keys or "pads" are not breakable, see "THE CODE BREAKERS THE STORY OF SECRET WRITING", by David Kahn, 1967, MacMillan Co. NY, N.Y., pages 394 through 403.

Generally, encryption provides for a key for transforming a raw message into an encoded version of the message, sometimes call a cipher text. The cipher text is transmitted, and the specific person to whom the message is directed has a key with which to decode the cipher text back into the original message. Obviously, the cipher text (when done properly) is not directly understandable, and the encoding and decoding keys are by definition related, but prior art encryption has focused on making it nearly impossible to decode the message without the decoding key by contriving complex encryption algorithms. With the availability of high speed, powerful computers employing complex decoding algorithms, it is easy to understand why the encryption industry has progressed by the development of increasingly more complex encoding schemes.

One specific technique to protect such communications is described in the U.S. patent to Ronald L. Rivest et al., entitled "CRYPTOGRAPHIC COMMUNICATIONS SYSTEMS AND METHOD", issued on Sep. 20, 1983 (assigned to M.I.T. of Cambridge Mass.), know as RSA—from the initials of the inventors. This patent provides and discloses a particular encryption scheme whereby the original message is considered to consist of a series of numbers, usually, large binary numbers (the message characters) which are raised to a specific power using an arbitrary number base (i.e. the remainder of an exponentiation operation divided by the product of two large prime numbers). The residue or remainder of these foregoing operations is the cipher text which is sent. The receiver decodes the cipher text by again breaking the cipher text up into a series of large binary numbers, raising these numbers to an exponent needed for decoding and then finding the remainder of the exponentiation again divided by the product of two large prime numbers. This technique is referred to as "exponentiation modulo n". The RSA patent provides for segmented operations since long numbers are not easily handled in most computers, where the message is broken up into segments that are encrypted separately. In addition, the patent describes hardware implementations and other operations that provide for a reliable "electronic signing" technique. In this patent in column 2, line 10 et seq., it is stated that "the quality of performance of a cryptographic system depends on the complexity of the encoding and decoding devices." This quotation has set the direction in which encryption techniques have developed.

Others have developed "public-key" systems where inventions use an encoding key that is made public, while the decoding key is known only to the receiver. Since encoding is the logical inverse of decoding, it would appear that making the encoding key public would give eavesdroppers a significant starting place from which to start to attempt to break (decode) a public-key encoded message. Herein, "logical inverse" is defined as retrieving an original message from an encoded message. However, very complex systems have been developed where the decoding is very difficult, even knowing the "public key" encoding scheme. See, "NEW DIRECTIONS IN CRYPTOGRAPHY", by Diffie and Hellman, IEEE Transactions on Information Theory, (1976).

RSA encryption and similar techniques are complex and such complexity gives rise to several problems:

Firstly, encryption computers must have significant computational capability to handle these calculations on a timely basis, and so, an arrangement of hardware numeric processors or extensive software routines, or combinations of both, must be purchased and installed to perform the calculations;

Secondly, and maybe more importantly, a long time (related to the number of computer operations necessary) is needed to encode and decode the message. Such time constraints preclude the use of such techniques with most real-time operations, such as video or other communications where fast or near real time decoding is essential. Of course, the use of large buffers and special hardware processors can mitigate this limitation, but such use entails costly, fast and very large buffers. Consequently, RSA-type encryption schemes have found only limited use where adequate hardware and software systems are available. There is a need for a simple, fast effective encryption system, that can be easily implemented and understood by the average user using a common personal computer.

Herein, arrays (or masks) are described as being comprised of elements. Such elements are defined as any logical grouping, for example: a bit, a nibble, a byte or word of any length. Furthermore, the descriptions herein use the binary system, but any modulo numbering or alphabet system can be used with the present invention.

Herein a masking array is defined as an array of data elements, such elements defined as any logical grouping described above, and wherein the masking array of data elements is logically combined with another data array, thereby producing a new resulting data array of encoded elements logically related directly to the masking array, during the process of encrypting or decrypting a message.

An object of this invention is to overcome the above illustrated limitations and problems by providing a simple, yet effective encryption scheme that can be implemented and used on the typical personal computer as well as higher performance computers. An aspect of effective encryption, and an object of this invention, is to provide for the use of encryption masks (arrays) that are common to computer users, yet virtually impossible for eavesdroppers to determine.

It is a further object of this invention to provide an encryption scheme and system where lengthy subroutines are not needed and where expensive hardware is not needed.

Another object of the present invention is to provide a fast encryption/decryption scheme that is useful in many real-time applications.

SUMMARY OF THE INVENTION

The foregoing objects are met in an encryption apparatus and method where at least two masks and a password are used to encode and to decode a message or other such information, and where the masks are derived from commonly found sources. The encryption apparatus comprises: means for retrieving information to be encoded—the information defining an array of D elements, a first mask array M1 of length N and a second mask array M2 of length N' (usually both M1 and M2 are of the same length, but this is not a requirement of the algorithm), a password array of P elements, wherein the P elements are utilized to provide an encryption guide, and an encoder that encodes the array of D elements, where the means for encoding include the means for performing a first operation of D elements and the elements in M1, forming intermediate products R' which are then modified by the elements in M2 which results in an array of encoded elements R which is the cipher text or encoded message. Decoding is achieved by processing the elements R in logical inverse order with M2 and M1 resulting in a decoded message of D elements.

Herein a password is defined as an array of elements that provide an encryption guide and information, including: specifying the order and type of arithmetic/logic operations used for encoding and decoding; whether any of the masking array elements, the message data array, or any resulting data array are to be complemented; providing offset addresses to be used as a starting location within the masking arrays for accessing the masking data; providing direction for modifying the order of processing the masking array elements; and providing values to be used for internal counters or other data modification operations that may be implemented.

In a preferred embodiment the first and second operations for encoding, mentioned just above, are "exclusive oring" (XOR), adding (ADD), and/or subtracting (SUB). The decoding provides for the logical inverse of the encoding. For these operations the logical inverse of an XOR is another XOR, the logical inverse of ADD is SUB, and the logical inverse of SUB is ADD. In the encoding and corresponding decoding, described above, any two, three or other combinations thereof of these operation may be used. However, in a preferred embodiment, the XOR and ADD are used. The use of two operations of the same type (either two XOR's or two ADD's) are to be avoided because their use does not increase the security of the system in the same manner as using two different operations. This is because, for example, the use of two successive XOR's is equivalent to the use of one XOR (albeit with different values). The order of the operations does not matter and an eavesdropper would only have to find the one XOR value to decode the message. Therefore, the security is not increased in this example by adding successive XOR operations. For the above discussion, ADD and SUB are considered the same operators because SUB is an ADD of a negative number.

In the above example, the piece-wise combination of the N elements in M1 by the N' elements in M2 results in a Q of length N times N'. Hereinafter, Q will be equal in size to N times N'. If D is greater than Q, then the Q combinations would have to be repeated to encode the D elements. This undesirable outcome is avoided by the password. The Q combinations are repeated utilizing the elements of the password array P for directions on how to combine the elements D, M1, M2 to continue forming the elements of R without encoding repetition. If when the last element of P has been used and there are still remaining D elements to be processed, then repetition will occur as the first element of P is used again and the scenario is repeated until all elements of D are processed. For example, in a preferred embodiment, if P represented 32 different combinations, then the password would allow non-repetitive encoding of a D with 32Q elements. The choice of 32 or 64 variations is dependent upon the implementation of the algorithm. In the preferred embodiment, 32 choices from the set of 64 are used. Which set of 32 are used is determined by the parity of the password string (T). The variations in sequence which may occur include: complementing D, M1, or M2 (giving 8 combinations), and/or swapping the values of M1 and M2 (giving another 8 combinations for a total of 16). By taking the operators as pairs ADD/XOR or XOR/ADD we have another 16 combinations giving us a set of 32 combinations. This is expanded to 64 combinations if we use SUB/XOR and XOR/SUB. In the preferred embodiment, only one set of 32 combinations out of the 64 will be used at any one time, either the XOR/ADD or XOR/SUB combinations. This is done to prevent, under certain conditions, a repetition within the cipher text in R which differs only by a value of 1 from another section in the cipher text R. If this occurs it may be possible by inspection of the cipher text to determine the size of N.

Another variable which makes decoding difficult is keeping the length N of the mask arrays M1 and M2 secret except to the sender and the receiver. If N is unknown to an eavesdropper, then N must be correctly guessed at for the proper decoding of the message (assuming D>Q, and all other information regarding the sources for the mask arrays and the password are known).

Two masking arrays M1 and M2 are employed instead of one larger array because:

1) Given a sampling method for building these arrays, the use of two arrays gives a much higher probability for a modification of the clear text even if one of the elements of M1 or M2 is 0 (null). This lessens the possibility that any clear-text will be placed into a portion of the cipher text in an unmodified form.

2) It makes simple XOR deciphering unusable because once the XOR operation is performed you still do not have a clear-text to determine whether you have successfully decoded the XOR operation, because an additional ADD or SUB operation must be done to recover the correct clear text.

3) The use of two arrays and two operator (XOR, ADD) allows for the permuting of the masking array elements against themselves. Hence the non-repetitive sequence Q is the length of $N^2$ (the length of M1 times the length of M2). Therefore, a small value of N relative to D will create a non-repetitive coding sequences of length Q that may be larger than D. For example, to encode a billion bytes of message D without repetition, the value for N needs to be only 31,623 bytes long, and could be achieved in 5,591 bytes if the correct 32 character password were employed, i.e. $(5,592)^2 \times 32 > 1 \times 10^9$.

4) The use of two arrays with a permutation length Q, provides for at least Q different independent operations on the clear text D. This minimizes the utility of a frequency distribution analysis to determine the occurrence rate or frequency distribution of letters in the clear text.

Care and inspection of the sources used for M1 and M2 is advised to prevent long repetitions of a constant value. Compressed or "Zipped" files work well, as do digital music or sound files. This inspection is important, but not fatal, to the encoding/decoding scheme because of the use of two arrays and two different logical operators, for example, ADD and XOR. As long as one of the entries of M1, M2, or the signal DCF (FIG. 3, item 21) are non zero, then the resultant cipher text will be different from the original clear text. It doesn't matter if the clear text is complemented, added to, or XOR'd, it will be modified, and the modification will not be obvious from the result.

An important advantage of the present invention is the multiplicity of sources of data bytes from which the mask arrays may be built. In fact, any grouping of digital elements can be used, for example, the contents of a music compact disk (CD). Since the music is a digitally encoded sequence, any sampling of the digital sequence on the CD can be used as the source for the masks. An analysis of a typical musical selection reveals that choosing the middle 8 bits of the 16 bit number gives a fairly uniform result across the range of all possible byte values. Other examples include any stored texts or program files that reside on floppy or hard computer disks, compressed files, backup disks and tapes, software distribution disks, scanned images, digital CAD drawings, photo-CD disks, any CD-ROM disks (corresponding to the red (IEC 908), Green, Yellow, or Orange (IEC 9660) standards and any variation of CD) which can be read into a computer, digital sound "wave"(*.WAV) files, or any other source of reproducible digital data.

Since a password and the arrays M1, M2 are needed to encode and to decode a message. If an eavesdropper has any one of these elements incorrect, the message will not be deciphered properly; and since no information concerning M1 and M2 or the password is found in the encoded message, it is difficult to decode the message.

In a preferred embodiment, a variation to the above algorithm employs a preliminary data transform, creating a Modified Data Byte (MDB), and a positional transformation as well as the normal encoding transformation of the elements D to R. The positional transformation reorders the ordinal numbering of the elements in R so that they do not match sequentially the ordinal numbering of the elements in D. The jumble is a function of the password employed and the application at hand. If only serial information is to be processed without buffering, then reordering or jumbling of the sequence is to be avoided. This is so because the advanced or retarded positional information cannot be corrected unless the data is stored in a memory buffer and then rearranged. The preliminary data transform used to create the MDB is implemented by XORing a counter against the incoming data byte. The MDB thus created when transformed by the encoding scheme has a smaller statistical variance from an ideally uniform distribution (in output byte values) than if this step were omitted.

Another advantage of the present invention is the speed of encoding and decoding. Such speed is directly related to the use of simple logical operations that are quickly executed is a small number of computer timing cycles that are found in the native instruction set of most computers. The speed performance allows the present invention to be applied to real-time transmission, for example video, or facsimile transmissions. However, in a preferred embodiment where speed is pre-eminent, hardware implementation of the simple logical/mathematical operations will improve the speed performance of apparatus embodying the present invention.

Another advantage of this invention is that it allows for easy implementation of one-time-pad encoding schemes (or variations) because of the wide varied of digital data available for encoding keys and the varied fashion in which these sources may be sampled to build the encoding keys, as well as the wide variety of passwords that may be employed.

To reiterate, the initial values used by the parties may be from any digital source: transmitted values, numeric equations, program code, software distribution diskettes, CD-ROMS, or any other re-creatable or retrievable digital source. Digital data is represented by binary bit strings. These strings may represent characters, integers, floating point numbers, or just bits. It doesn't matter what the form is, because they may all be used with or without modification. The choice is up to the user. Whether a bit string is a floating point number, integer, or characters depends upon how the user desires to interpret the information. At the bit level it is all interchangeable.

The security of this invention lies not in the security of the logic/mathematic operations utilized (though that may help), but rather it lies in the obscurity of the keys and passwords employed.

Other objects, features and advantages will be apparent from the following detailed description of preferred embodiments thereof taken in conjunction with the accompanying drawings in which:

DETAILED DESCRIPTION OF PREFERRED EMBODIMENTS

Figure 1:
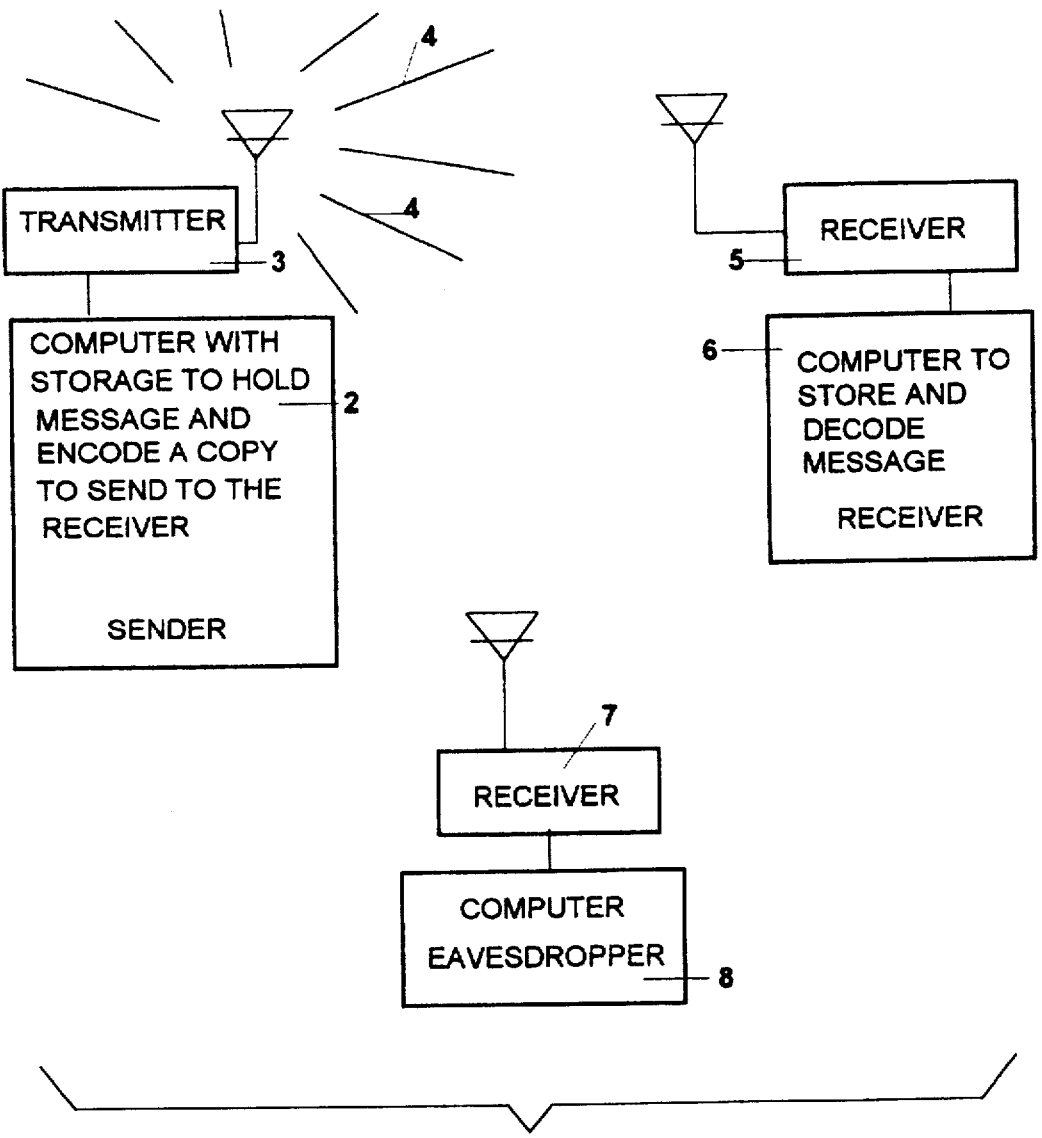
FIG. 1 is a functional block diagram of a message transmission system.

FIG. 1 shows a basic block diagram of a communications system using the present invention wherein a confidential message is being sent by a SENDER by radio to a RECEIVER, but where the message is also received by an EAVESDROPPER. The message is encoded in a computer system 2 and transmitted 3 by radio 4 to a receiver 5. The received message is decoded and/or stored in a computer at the receiving location 6 and is available to the RECEIVER to which the message was sent. However, in this system there is a receiver 7 that may intercept the encoded message. The intercepted encoded message may then be fed into powerful computing systems 8 where attempts would be made to decode the message. Other such systems, not shown, where the present invention may be applied to encode the information include telephone access to databases where confidential information is held. In such cases, the eavesdropper will download the encoded information in the eavesdropper's computing system where decoding would be attempted. The following discussions of preferred embodiments center on the encoding and decoding schemes of the present invention, not on the well known communication and data storage/access means, where the individual apparatus are well known and may be found in any commonly found electronics of personal computer magazine or newsletter. These communication and database means are discussed herein in broad known terms.

Figure 2:
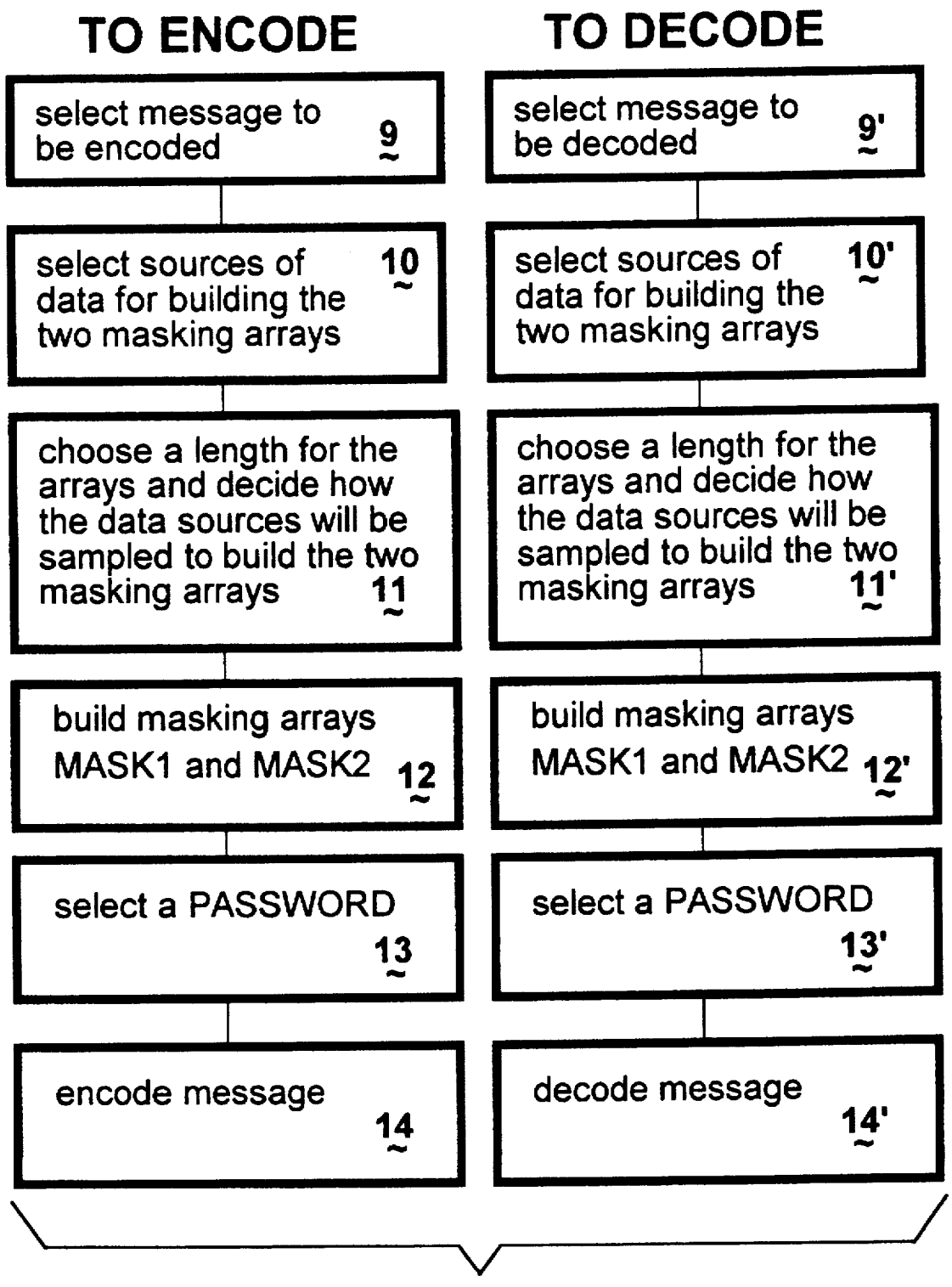
FIG. 2 is a listing of the steps needed to encode or decode a message pursuant to a preferred embodiment.

FIG. 2 shows a flow block diagram of steps of encoding and decoding a message in accordance with the present invention. Select the message step 9 to be encoded and place the message in a computer accessible buffer memory. The length of the message is known. Next, select the sources step 10 to be used for building the two masking arrays, choose the length step 11 of the masking arrays and how the source files should be sampled, and build step 12 the mask arrays. Select step 13 a password to be used for this message, and proceed to encode step 14 the message for sending. The decoding is shown utilizing essentially the same steps corresponding to the encoding steps, 9', 10', 11', 12', 13' and 14', wherein only the word "encode" is replaced by "decode".

If any of these elements differ between encoding and decoding, the message will not be deciphered properly.

Still referring to FIG. 2, item 10, as stated previously the sources for the data bytes to be used in building the mask arrays can come from any source. That is, a program can generate them from a mathematical equation, they can be a digitized music file, a scanned image, a music CD-ROM, any program file on a computer (source or executable), or any other digital source where the information can be repeatedly retrieved. In part FIG. 2, item 11, the user must decide on how the selected sources will be sampled, i.e. the starting offset into the source, and the distance between additional sampling points in that source file. These samplings are used to build the masking arrays MSK1 (FIG. 4A, item 34), MSK2 (FIG. 4B, item 35) whose lengths are selectable providing a further impediment for unauthorized decoding. The mask array length provides a combinatorial length equal to the product of the individual lengths of the mask arrays. In the preferred embodiment, the arrays are of the same length N, resulting in a sequence distance Q of $N^2$ elemental combinations before repetition. A password, item 13, is selected to expand the effective combinatorial sequence length Q by providing for modifications to the data and control flow in the processing scheme. The password allows for a set of up to 32 (out of 64) variations of Q based on the character selection and length of the password. Therefore the maximal non-repetitive output length given a constant input value would be 32Q ($32N^2$). Because of the variations involved, it is difficult to determine by inspection of the cipher text the size of KQ, for K=2 to 32, verses an initially larger Q' equal in length to KQ. Therefore for an eavesdropper to determine N from an inspection of the cipher text is quite a formidable task. Consequently the use of a password to control the encoding process makes it difficult for an eavesdropper to guess the size of the mask arrays M1, M2 by inspection of the cipher text.

Again, all the steps in FIG. 2 must be identical between the encoding and the corresponding decoding operation or the message will not be properly deciphered; specifically and especially the sources for building the mask arrays, their lengths and the password employed. Hence our main protection to ensure the security of the message exists in the obscurity and significant variety in the selection of these three parts. There is an unlimited source of material which can be used to build the masking arrays; the sampling of these arrays is only limited by the imagination of the user; so the resulting protection scheme is very secure.

Still referring to FIG. 2, items 10 and 11 could be described by an Array Description File (herein referred to as ADF) which has the following format:

ARRAY #1 SOURCE, STARTING OFFSET, SAMPLING INDEX, MASK SIZE

ARRAY #2 SOURCE, STARTING OFFSET, SAMPLING INDEX, PAUSE FLAG (with text area for comments or notations).

Arrays #1 and #2 specify the source files for building the masking arrays. If wild card characters (* or ?) are used for a file name, such as B:*.* (as is used in PC DOS systems), the first matching file will be used. For example, if a diskette from a large set of backup disks is used, the file name on the diskettes may not be known ahead of time by the user, and the use of a wild card designation *.* will allow the diskette to be read. Of course, the file name specification can be more restrictive if desired. The pause flag when set equal to a 1 (versus 0) is active to allow the user time to load a diskette into the computer before proceeding. Other data sources for mask arrays using an ADF would be the software distribution diskettes which come with major computer programs such as Microsoft's Excel or Word, etc. These files are in a compressed form and are an excellent readily available source for the user. If disk backup diskettes are used, they should be inspected before hand, using a program similar to Symantec's Norton Utility, to make sure the user specifies areas which are not of constant value. As the names implies, the STARTING OFFSET and the SAMPLING INDEX, as used above, are, respectively, the ordinal number of the byte where data sampling will commence, and the distance in bytes to the next sampling point. The actual index (counting from 0) into the source file is computed as:

Eq. 1 SAMPLE BYTE INDEX=(SO+(I*SI))MODULO FL

Where SO=Sample Offset, SI=Sampling Index, FL=The source file length in bytes, I=the ith element for the Mask Array (counting from 0).

Because of the modulo (FL) operation, it is never possible to sample a point outside of the specified source file. The computed index value will just wrap around to the beginning of the file.

Because the ADF may completely describe the source and sampling sequence for both of the masking arrays, for example when the sources are files to be found on non-removable media, then the security of the ADF is important. This can be addressed in two different ways: firstly, the ADF could exist on a diskette which must be kept physically secure when not in use, or secondly, several hundred or thousand ADF may be generated. Thus the actual one being used would also have to be guessed at. In addition, the file name entries in the ADF can also be obscured through the use of the previously mentioned wild card characters.

Finally the password character string P used to encode the file provides another level of security for a message D. This is because the password string P is used to direct the encoding/decoding scheme, as well as providing the initial Encryption Starting Offset, ESO (FIG. 3B, item 30), value for the address register/counter for the MSK1 (FIG. 4A, item 26) and MSK2 [FIG. 4B, item 27) arrays and the Buffer Pointer address Modifier, BPM (FIG. 3B, item 28) value. All of which control the operation of the encoding/decoding scheme.

Additional sampling schemes, other than the preceding ADF method, may be used to access digital sources and build the mask arrays so long as the methods provide for repeatability of retrieval and variation in the information obtained. For example a random number generator could be used to calculate a SAMPLE BYTE INDEX into a file (again modulo the file length). Any one familiar with random or pseudo random number generators could easily implement this method.

Multiple uses of the encoding scheme herein described, do not significantly increase the security of the message relative to the difficulty of breaking through only one layer or encoding. This is partly due to the fact that the bit distribution of the data in the message bytes versus the cipher text is unaffected. That is, eight bits of encoded message equal eight bits of data In the clear text message. The only way around this is to use an intermediate step between successive encodings where the number of the bits making up an encoded cipher text is spread out over a larger space than is occupied by the original clear text. This can easily be done by a simple transform (using equation, Eq. 2, for one of the variables) described below:

Eq. 2 $W$=Integer Part of $(\ln(B^C-1)/\ln(2))$

Where B is the new number base, C the number of character/digits to be grouped together to form a "byte" in our new number base, and W is the number of bits of message data to shift into our new number base before conversion.

Once the bits have been shifted into a register, then writing the remainder of the successive division of this register (by the new number base) and in reverse order convert these remainders to printable ASCII characters (by adding a value greater than 20(hex)—the space character) provides another level of encryption which the user may employ. The inverse of this operation is to read back the digits of the number, remove the printing offset (to convert the digits back to the base B), convert them back into a binary number and shift the resultant W bits back into a recovered message data file.

In Summary the conversion from binary to groups of all printable characters (GROUP) using a chosen number base (BASE) is as follows:

1) Calculate W from equation 2;
2) Access the encoded message in bytes (W bits wide) and then convert these bytes to a number (NUMBER);
3) Divide NUMBER by the BASE, GROUP times, saving the remainder of the division each time;
4) Access the remainders of step 3 in reverse order, convert them to printable characters (either through table look up or through an algorithm);
5) Output the resultant GROUP number of characters and if desired add an extra "space" character to show the group boundaries, though this step is not needed.
6) Repeat step 2 to 5 as needed until all of the binary information has been transformed, padding out any last bits as needed with 0's.

The remainder of the first division is the $(BASE)^0$ digit, the next is the $(BASE)^1$ then $(BASE)^2$ digits, etc.

The original bit string is recovered as follows:

1) Set a variable SUM equal to 0;
2) Then for GROUP times perform:
   2a) DIGIT=Character converted back to a BASE digit
   2b) SUM=(SUM * BASE)+DIGIT
3) The resultant SUM is the recovered number. Send the resultant byte (W bits wide) to an output file (most significant bit first) as the recovered binary form.

The conversion of number bases can be used by itself as a crude encryption scheme because there is some leeway between W and the number base chosen. That is over a limited range several different number bases will utilized the same W value. For example W=25 bits corresponds directly to number bases 33 through 36. And the choice of the wrong number base will result in the improper decoding of the cipher text.

This mechanism has the effect of spreading the original message data bits out over a larger ASCII byte sequence. Another effect of this conversion is to convert the encrypted data file to all printable characters. This may be necessary under some conditions where encoded bytes might mimic transfer control sequence bytes and prevent correct transmission of the cipher text.

The use of this intermediate conversion of an encoded file to all printable characters allows the file to be encoded again with further increases in security.

Below is a segment from a file converted to all printable characters using Eq. 2 (base 36 numbers (A–Z, then 0–9) in five letter groups):

performed. This technique increases the dispersion (variety) of the distribution of letters in a typical encoded message. For example, the letter "e" in English occurs more than any other letter. If this operation is left out, the dispersion of the encoded bytes of text across the value space of (0 to 255) is typically not as even as when this technique is employed. This technique, as well as the general encoding scheme employed herein, significantly increases the dispersion or smoothing of the distribution of occurrences of characters in the encoded message. Another advantage of employing the MDB techniques is that even if DCF, M1 and M2 are all zero, the likelihood of clear text going unmodified into the cipher text is less than 0.5% because the clear text is still modified by the address counter, or some variation of the address counter.

Figure 9:
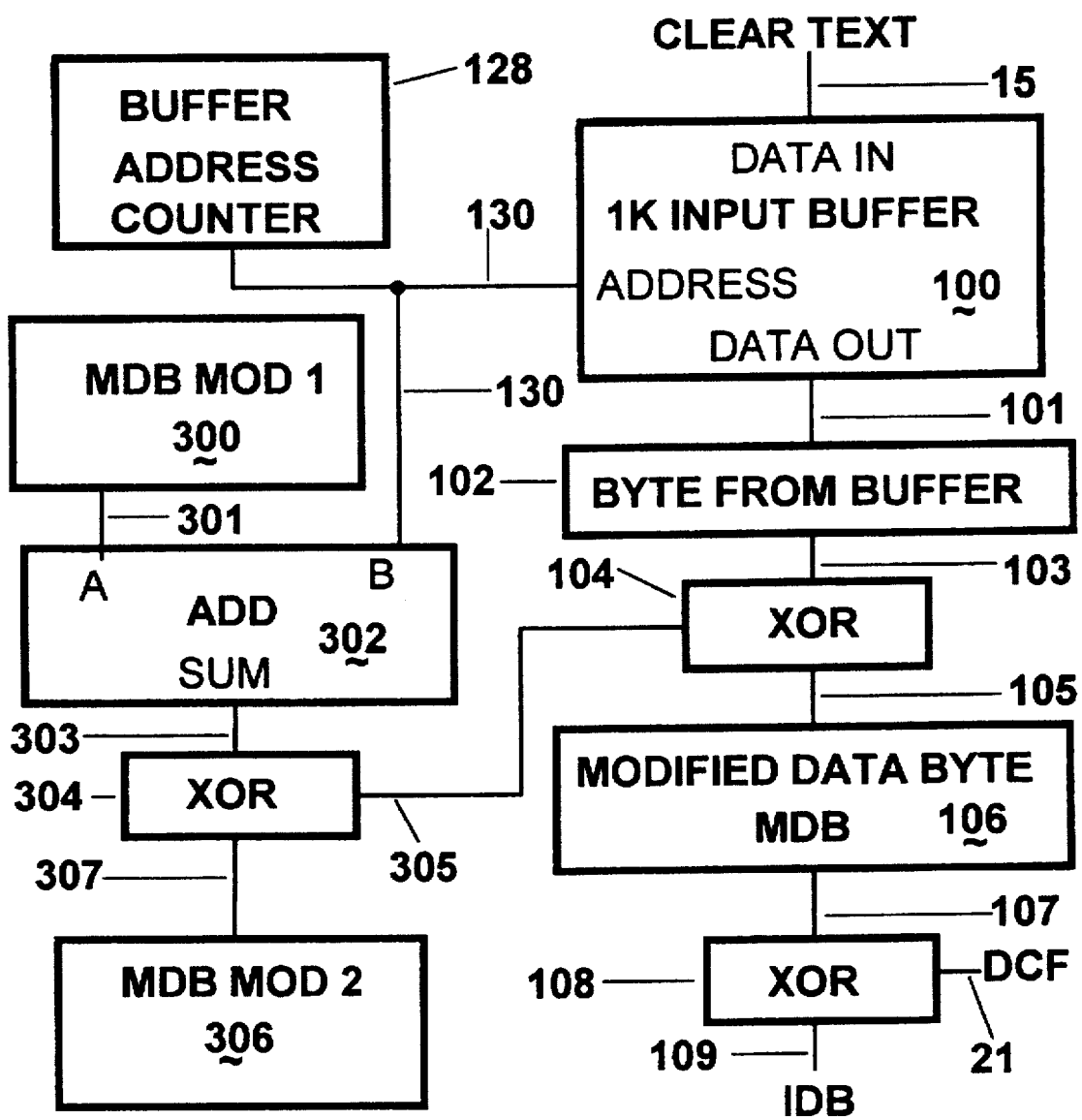
FIG. 9 is a schematic/block diagram of a variation in creating a modified Data Byte, MDB.

Other variations, shown in FIG. 9, of this counter technique may be employed where the counter value is modified by the addition or subtraction of a constant, is modified by

```
NTCAY T60G0 OOBNM G9YQO TDKPC FKYD4 NLO9L C8LWT HSH75 L2F5V S0D93 G5M3A E1WC6

RYLG6 KPGD4 OS2WF GL5KA FP5QA JUQ8C PAF71 TGV5K PCD0D NZK40 TCKIS D6RR0 COF90

NWX4Z TIS4Y QVB07 NH386 D59S7 S6CWQ M4YFX RT0VS HVMF2 J6KUB MH0JX H7MNS RGYPB

DOQXY JUJDP FRUMA QPH6Q JPZIF KZ0N1 T0XL3 H38OO IX6ID MWONG PML4P MZZFZ D77Y4

H8DTD MDAI8 ETYC4 FAPV4 RTB4Z QR0YW SH35I MDCMI GQULG QWABB J4TTO BVJP4 HJ2FQ
```

The encoding or decoding, in the preferred embodiment of FIG. 2, is done by utilizing the logical operations XOR, ADD, and SUB. Other preferred embodiments may use other operations wherein the decoding operation restores the complete original message. In this example, an XOR is the logical inverse of XOR, a SUB is the logical inverse of ADD, and correspondingly, an ADD is the logical inverse of SUB. With the two masks selected, two logical operations are selected from the three listed. They are grouped as XOR-ADD or XOR-SUB, or ADD-XOR, or SUB-XOR. In the preferred embodiment only the pair XOR-ADD, ADD-XOR, or the pair XOR-SUB, SUB-XOR are used at any one time. Since we allow for the message data bytes to be 1's complemented, if the preceding restriction were not imposed, it could be possible, with a constant message value and ignoring any MDB operations, to encode a sequence of length Q which would differ from another sequence of length Q only by a value of 1, thus giving away the size of the arrays N. This is possible because SUBTRACTION, in most binary computing systems, is implemented by ADDITION of a 2's complement of the number being subtracted. The 2's complement number is formed by taking the 1's complement of the number and adding 1 to it, hence the previously mentioned restriction. Whether this restriction is used or not does not effect the general encoding/decoding scheme. Though through the use of the MDB (Modified Data Byte) technique, described before and below, this restriction would be minimized in most cases and 64 variations of the combinatorial sequence Q could be employed.

In other preferred embodiments, more complex uses of such masking arrays can be devices where some elements are inverted and others not inverted, or the order of using the elements in the arrays can be changed. Such techniques allow for longer message lengths to be encoded without duplication.

A significant advantage of the present invention, in the preferred embodiment, emanates from the use of a counter to XOR the incoming message data, creating a Modified Data Byte (MDB), before other encoding operations are XORing another value with the counter, or any combination of these operations, before being applied to the input data byte to be encoded. The logical inverse operation of those employed for encoding will be need to decode the data correctly. However it is done, the use of a sequential counter value (in some form) will increase the dispersion, or evenness of distribution, of the encoded data bytes across the range of possible values.

Figure 3A:
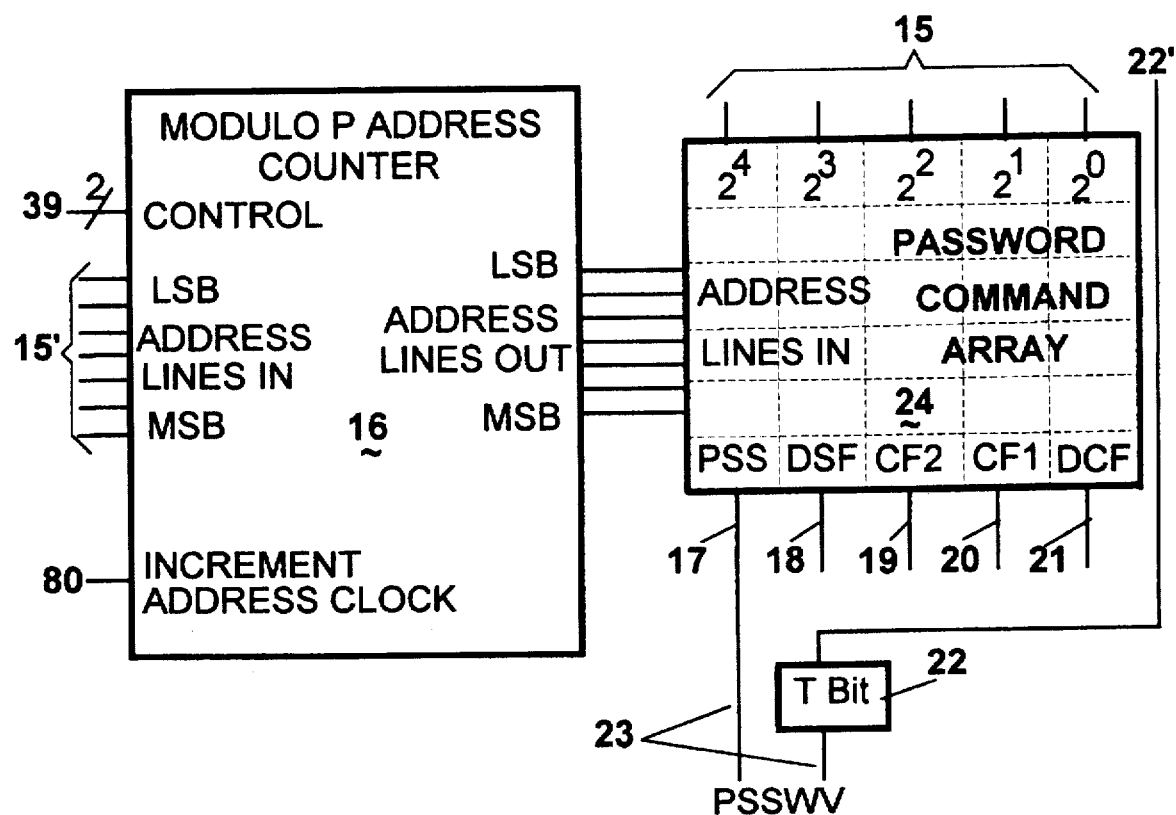
FIG. 3A is a functional block diagram of the password command array of the embodiment, and showing how the array is accessed to provide the variables used to control the operation of the encoding system.
Figure 5:
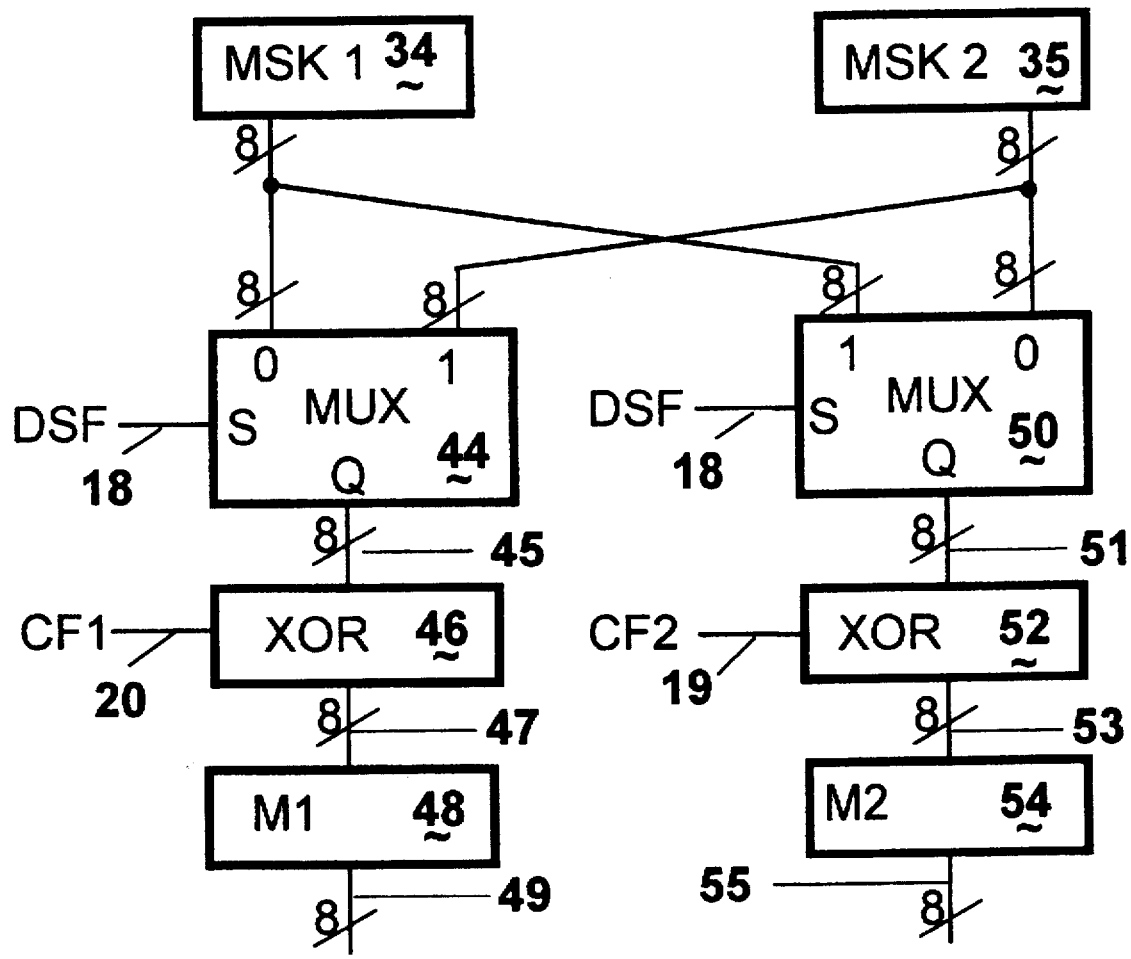
FIG. 5 is a functional block diagram of the mask data modification logic.

In FIG. 3A, the lower five bits of each password character are stored in a Password Command Array 24 through the use of the data input lines 15, the address lines 15' and the control signals 39. Once Q elements of D have been processed the Address Register/Counter 16 for this password Command Array is incremented to next location by item 80 which originates from FIG. 6B. This occurs every Q times. The Register/Counter 16 operates modulo P, where P is the length of the password in bytes. Below is a description of the five output bits of this password command array:

PSS 17=Password Sequence Selector (selects sequence of XOR, ADD, SUB, when used with T bit 22, see PSSWV 23;

DSF 18=Data Swap Flag (indicates if mask elements MSK1 34 and MSK2 35 are to be swapped), see FIG. 5;

CF1 19=Complement Mask #1 Flag (indicates if MSK1 34 is to be 1's complemented);

CF2 20=Complement Mask #2 Flag (indicates if MSK2 35 is to be 1's complemented);

DCF 21=Data Complement Flag (indicates if the Modified Data Byte, MDB is to be 1's complemented).

T Bit 22=Parity of Password String (see Eq. 3.)

PSSWV 23=two bit signal, equal to 2 times PSS plus T bit.

$$T = \text{Least Significant Bit of} \sum_{i=0}^{i=p-1} PWC(i) \qquad \text{Eq. 3}$$

Where PWC(i) is the ith entry in the Password Command Array, item 24.

The uses for CF1 20, CF2 19, and DSF 18 are shown in FIG. 5. The one bit wide signals CF1 20 and CF2 19 are expanded to modify all bits processed as a logical "byte" in the encoding scheme. Where "byte" herein is not limited to just eight bits, but rather is a unit of embodiment (i.e. 2, 4, 8, 16, 32 bits, etc.).

PSS 17 is used with the T bit 22 to calculate a value for PSSWV 23 of zero, two or one, three which is used to control the encoding and decoding sequences of our scheme.

DCF 21 is a 1 bit signal which is again expanded to the size of our logical "byte" and which is XOR'd with our modified data byte, MDB, to produce its one's complement if DCF 21 is a one. When DCF 21 is a zero, no change in the modified data byte will occur.

Figure 3B:
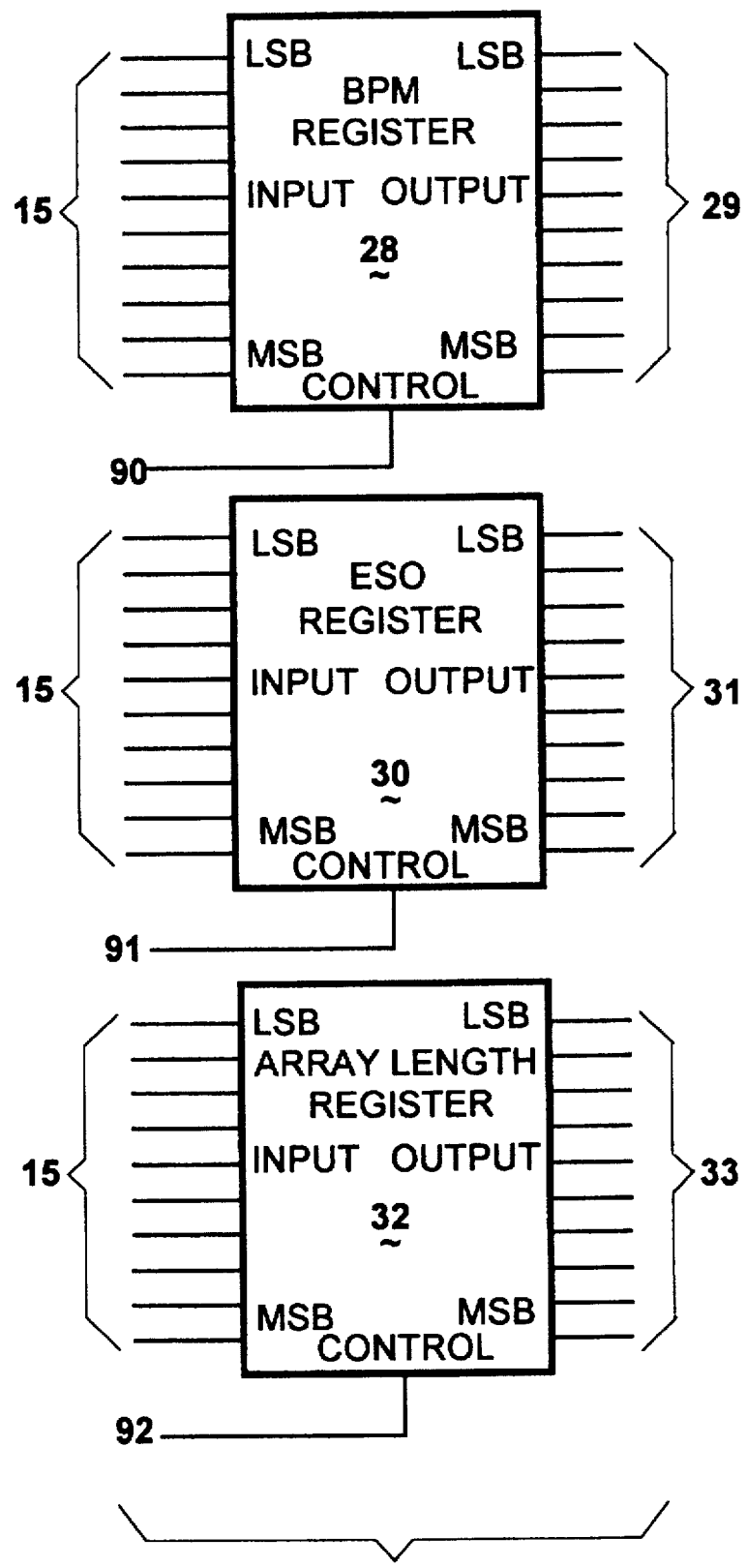
FIG. 3B is a functional block diagram of the BPM, ESO and Array Length Registers.

In FIG. 3B, The input data lines, 15, are used to load information into: the BPM Register, 28, using control 90; the ESO register, 30, using control 91; and into the Array Length Register, 32, using control 92. The value in the Array Length Register is the number of bytes in each of the mask arrays.

Again referring to FIG. 3B, ESO 30 and BPM 28 values are all derived from the value of the ASCII characters used to make up the password for either encoding or decoding. ESO 30 is the Encryption Starting Offset value. This value is used as the initial starting value for the address counters for both MSK1 34 and MSK2 35 arrays after these arrays have been loaded with mask bytes. BPM 28 is a Buffer Pointer (address) Modifier whose bit width is proportion to the size of the address buffering employed. In the PC (personal computer) environment, a 1024 byte buffer was used since the normal unit of storage is typically 2048 bytes. The size of this buffer is not critical to the operation of the encoding/decoding scheme and any value can be used. For example, a buffer size of 256 bytes would probably be employed for the scrambling of facsimile information. When the BPM mechanism is employed, the size of the buffer should be a power of two. For certain applications it may be desirable to set BPM=0 only. The value of BPM 29 is XOR'd 140 with the buffer address value 130 for encoding to produce an actual working address for the respective data buffer 134. This has the effect of scrambling the sequence of address entries 134, into the output buffer 138 when encoding, or the sequence of the addresses 234 for sampling the entries from the input buffer 200 when decoding. Since the Buffer Address Counters output 130 is used to XOR 104 the input data byte 102 creating the MDB 106 to increase the dispersion of the message data, it is helpful to reorder the resultant ordinal sequence of the encoded bytes to increase the difficulty for an eavesdropper in decoding the message.

$$ESO = \left( \sum_{i=0}^{i=p-1} (2 \times PWC(i-1) + PWC(i)) \text{ Modulo } N \right) \quad \text{Eq. 4}$$

$$BPM = ESO \text{ Modulo } 1024 \quad \text{Eq. 5}$$

The formulas used to compute the ESO and BPM values are not critical to the encoding scheme, they just must be consistent with themselves from encoding to decoding. Other formulas or equations could be used to compute these values, instead of the ones presented here, without invalidating the encoding/decoding scheme. For example:

$$ESO = \left( \sum_{i=0}^{i=p-1} ((5 \times PWC(i)) + (3 \times PWC(i-1))) \text{ Modulo } N \right) \quad \text{Eq. 6}$$

$$BPM = (ESO \times 19) \text{ Modulo } 1024 \quad \text{Eq. 7}$$

Figure 10:
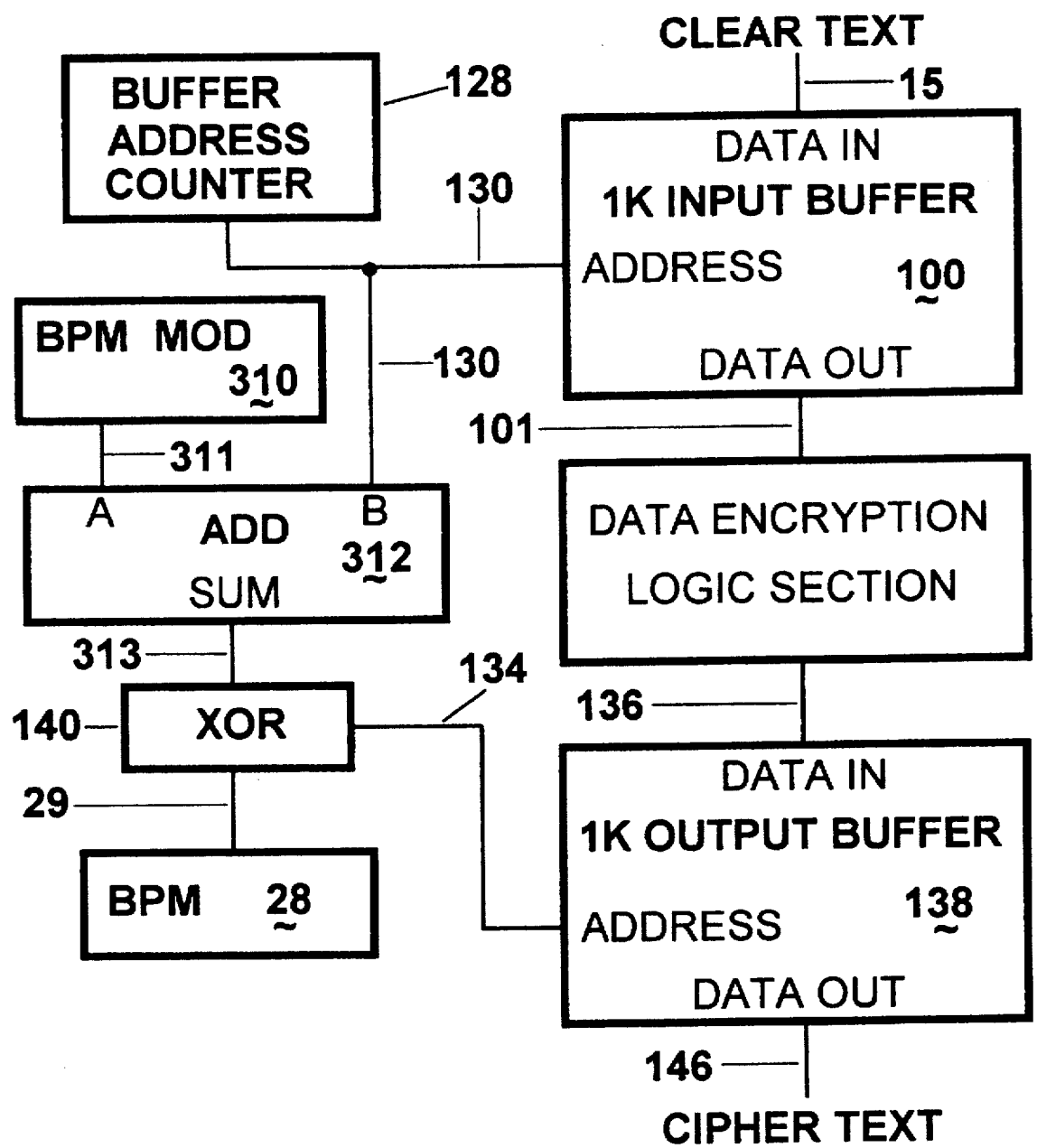
FIG. 10 is a schematic/block diagram of a variation in the generation and use of a Buffer Pointer Modifier, PBM, to scramble the output sequence.

It is possible if so desired to calculate a separate ESO value, not shown, for each of the two mask arrays. As long as the equations are consistently applied for both encoding and decoding, the methods will work. All ESO does is provide a starting point for sampling the mask arrays that is usually not the first entry, and as long as the computation is done modulo N (the length of the array), then the password will provide a unique starting point. Similarly, BPM is used to provide a mask to scramble the addressing value and should be done modulo the length of the input/output buffer. FIGS. 10 provides an alternative implementation using the BPM value.

Figure 4A:
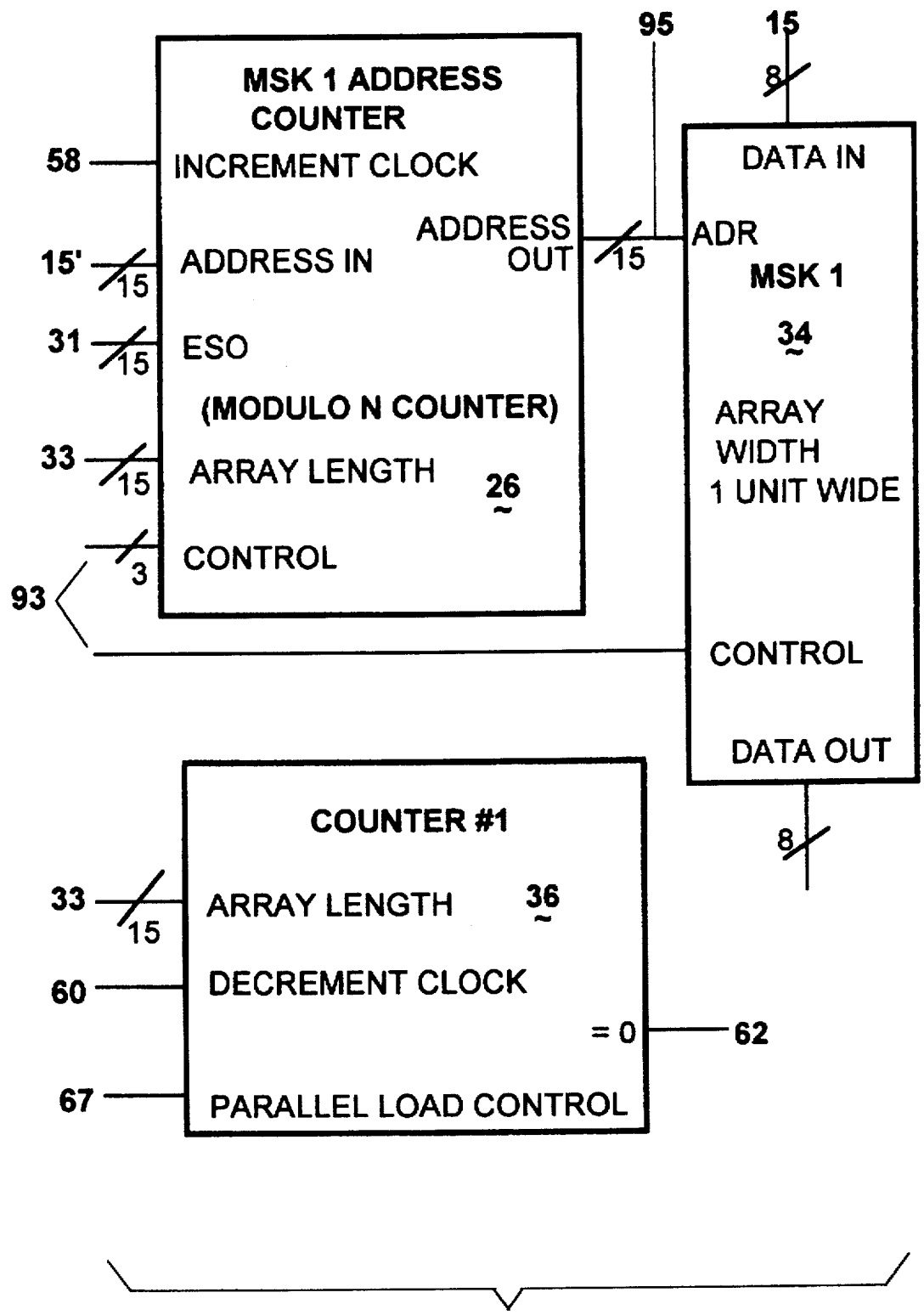
FIG. 4A is a functional block diagram of a first mask array and its counter.

FIG. 4A shows a functional block diagram for the first mask array, an address counter, and a length counter. Through use of the control lines 93, data lines 15, and address line 15' the first mask array is built in MSK1 34. After the mask array is built, the address counter for this array 26 is initialized to the ESO (Encryption Starting Offset) value 31 (FIG. 3B) again using the control lines 93. The size of the array which was built in MSK1 34 is loaded into COUNTER #1 36. This is accomplished by taking the output of the Array Length Register 33 and loading it into the counter using the control line 67. This step is also illustrated in the initialization operation shown by FIG. 6A. Once data encryption has started, the address counter 26 is incremented after each data byte has been processed by item 58. This counter is designed to operate modulo N, where N, the value of the array length is given by item 33. Also after the data byte has been processed, COUNTER #1 is decremented by 60. Details of this are given by FIG. 6B. The COUNTER #1=0 signal 62 is used in FIG. 6B to control the clocking of COUNTER #2 37 and the MSK2 address counter 27. Details are given in FIG. 6B. The output of the MSK1 array 34 goes to the two multiplexers 44 and 50 (FIG. 5) which may further modify the mask array value.

Figure 4B:
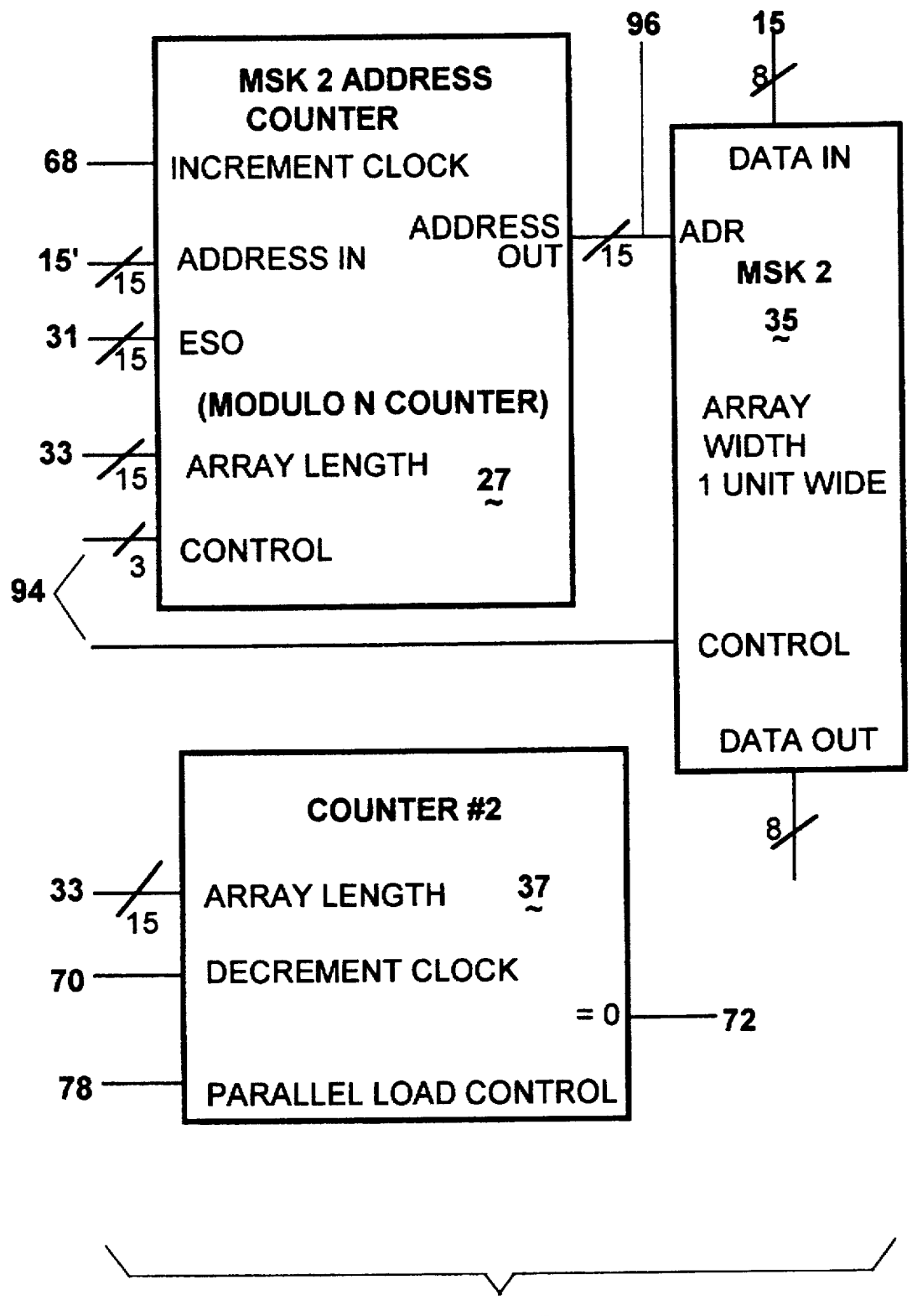
FIG. 4B is a functional block diagram of a second mask array and its counter.
Figure 6A:
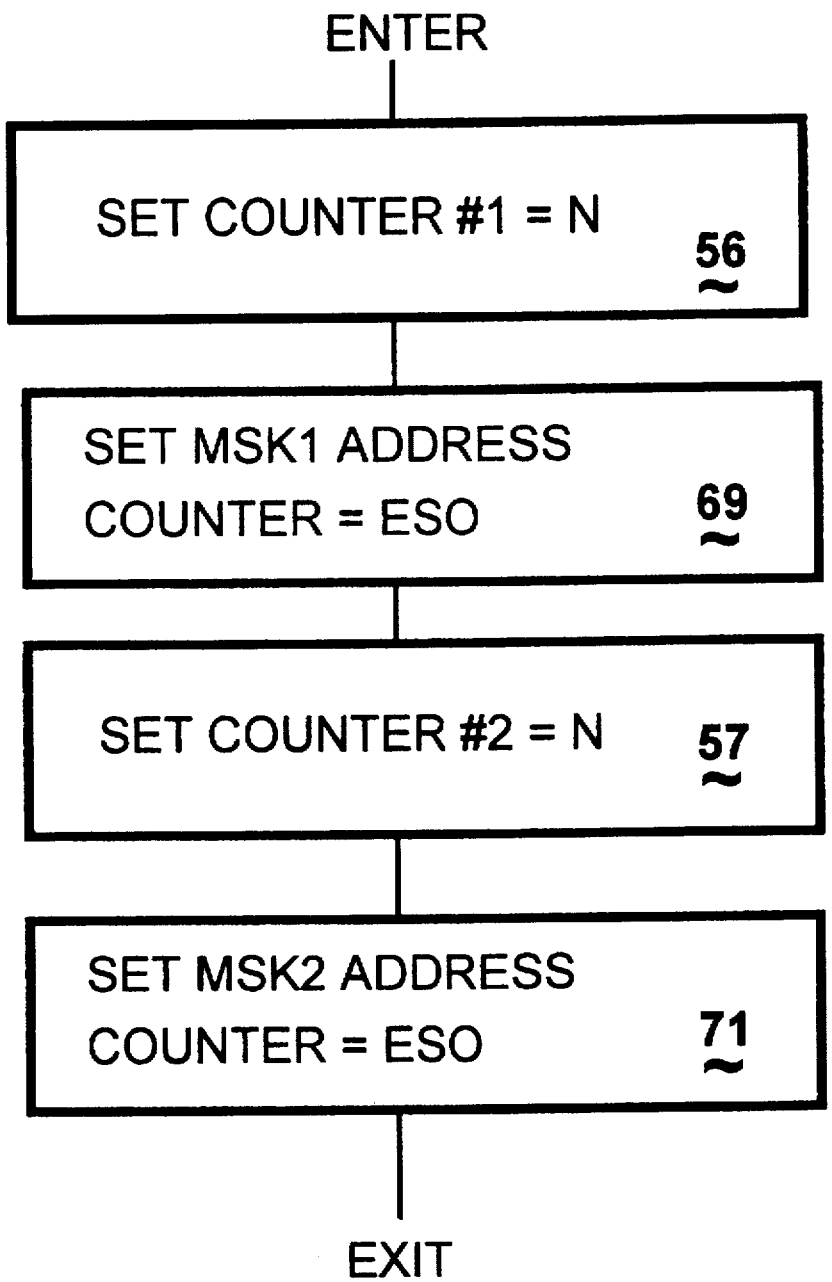
FIG. 6A is a functional block diagram of the initialization sequence.

FIG. 4B shows a functional block diagram for the second mask array, an address counter, and a length counter. Through use of the control lines 94, data lines 15, and address line 15' the first mask array is built in MSK2 35. After the mask array is built, the address counter for this array 27 is initialized to the ESO (Encryption Starting Offset) value 31 (FIG. 3B) again using the control lines 94 (FIG. 6A). The size of the array which was built in MSK2 35 is loaded into COUNTER #2 37. This is accomplished by taking the output of the Array Length Register 33 and loading it into the counter using the control line 78. This step is also illustrated in the initialization operation shown by FIG. 6A. Once data encryption has started, the address counter 27 is incremented after each data byte has been processed. This counter is designed to operate modulo N, where N, the value of the array length is given by item 33. Also COUNTER #2 is decremented, item 70, once each data byte has been processed. Details of this are given by FIG. 6B. The COUNTER #2=0 signal 72 is used to control the incrementing of the Password modulo P address counter 16 through control line 80 (FIG. 3A). The output of the MSK2 array 35 goes to the two multiplexers 44 and 50 (FIG. 5) which may further modify the mask array value.

The address lines (items 95 and 96) between the address counters and the mask data arrays for both FIG. 4A and FIG. 4B are being shown 15 bits wide. This width is for illustrative purposes only, and any other bit width may be used.

FIG. 5 shows illustrates how the working values M1 48 and M2 54 are derived from the values MSK1 34 and MSK2 35 and the signals DSF 18, CF1 20, and CF2 19 (FIG. 3A). M1 48 and M2 54 are described by the following equations:

$$\text{Eq. 8} \quad M1 = ((DSF \cdot MSK2) \oplus (NOT(DSF) \cdot MSK1)) \textcircled{x} CF1$$

$$\text{Eq. 9} \quad M2 = ((DSF \cdot MSK1) \oplus (NOT(DSF) \cdot MSK2)) \textcircled{x} CF2$$

(Where $\cdot$=AND, $\oplus$=Inclusive OR, and $\textcircled{x}$=Exclusive OR)

DSF 18 is used to control the input selection of the two multiplexers 44 and 50 while CF1 20 and CF2 19 are 1 bit signals expanded to modify the complete bit width of the output of the multiplexers 45 and 51 through the XOR's 46 and 52 respectively. DSF 18, when set equal to 1, swaps the values of MSK1 34 and MSK2 35. The output of the first multiplexer 45 is XOR'd 46 with CF1 20 to give a resultant value 47 which is stored in M1 48. This value is either unaltered or is the 1's complement of the output of the multiplexer 45 depending upon the value of CF1 being either 0 or 1. Similarly, the output of the second multiplexer 51 is XOR'd 52 with CF2 19 to give a resultant value 53 which is stored in M2 54. Again this value is either unaltered or is the 1's complement of the output of the Multiplexer 51 depending upon the value of CF2 being either 0 or 1.

FIG. 6A shows a flow chart of the initialization operations which must be performed once for each encryption or decryption. The two permutation counters, COUNTER #1, 56, and COUNTER #2, 57, are loaded with an initial value from mask array length register 33. This initialization needs to be performed only once at the start for either encoding or decoding. Also as part of the initialization operation the ESO 30, Encryption Starting Offset, value is loaded into both the MSK1 26 and MSK2 27 address counters (steps 69 & 71) by the output of the ESO register 31 and control lines 93 and 94 respectively.

Figure 6B:
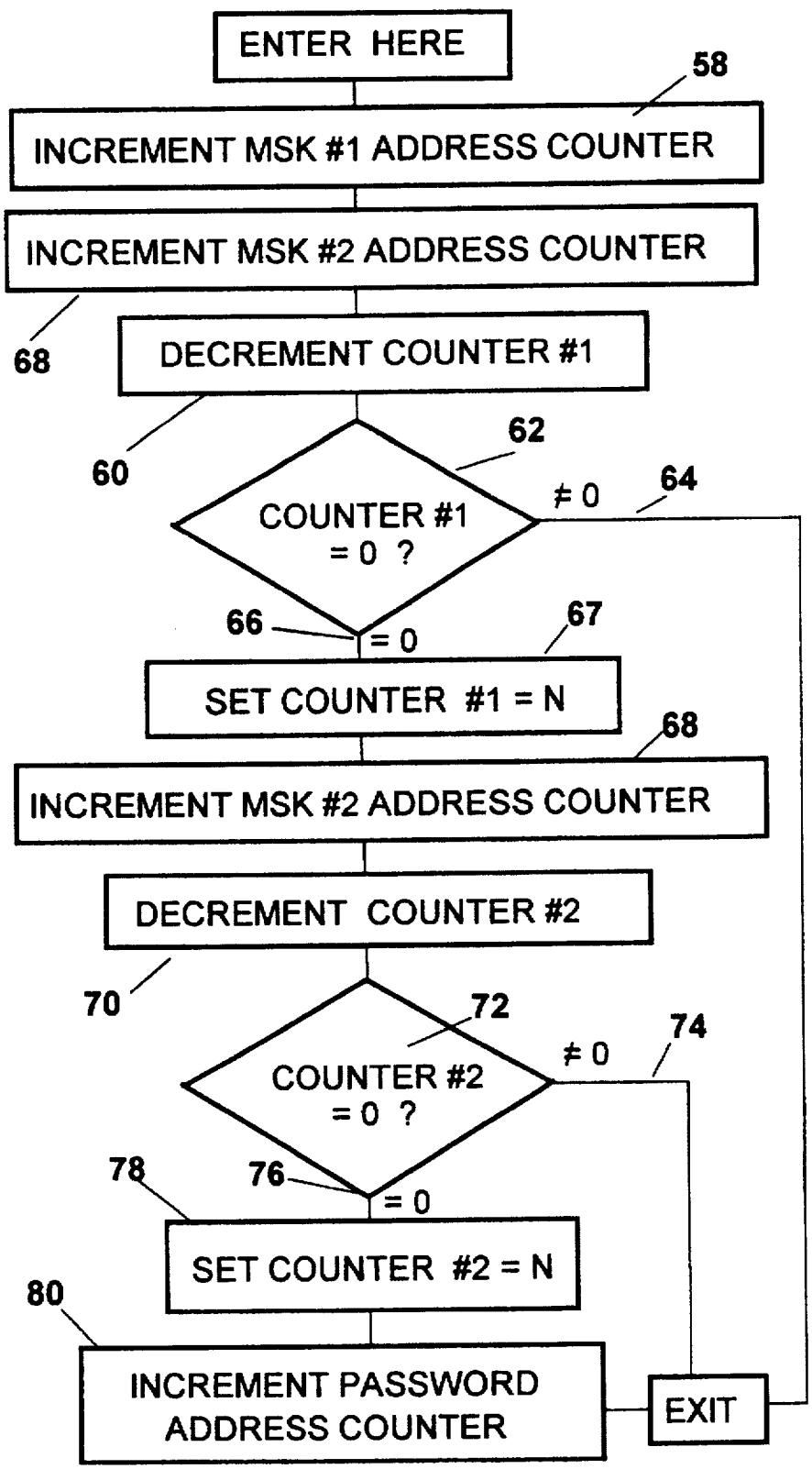
FIG. 6B is a functional block diagram of the mask array addressing.

FIG. 6B shows the sequence which is gone through after each data byte has been processed. It consists of:

1) incrementing the First Mask Array address counters MSK1 26 by 58;

2) incrementing the Second Mask Array address counter MSK2 27 by 68;

3) decrementing COUNTER #1 by 1 using item 60.

Whenever COUNTER #1 36 is counted down to 0, item 62, the following occurs:

1) the value of COUNTER #1 is reloaded to N using items 33 and 67;

2) the address register to the MSK2 Array 27 is incremented by 1 using item 68;

3) and COUNTER #2 is decremented by 1 using item 70.

Because the address register/counters for MSK1 Array 26 and MSK2 Array 27 are modulo N counters, the effect of the extra count pulse 68 going to the MSK2 address register/counter 27, when COUNTER #1 36 is zero 62, is to cause all possible permutations of the values of the MSK1 Array 34 and the MSK2 Array 35 to be sequenced. Thus the combinatorial length Q of the sequence is $N^2$.

When COUNTER #2 37 reaches zero 72 the following occurs:

1) the value of COUNTER #2 is reloaded to N using items 33 and 78;

2) the PWC address register is incremented by 1, item 80.

The incrementing of the PWC address register by 1 (modulo P) gives the encoding scheme new values for DSF 18, CF2 19, CF1 20, DCF 21, and PSSWV 23 derived by the bit pattern in next entry of the PWC Array 24. These variables allow for a non-repetitive variation in the cipher text over multiple permutations sequences of length Q even if the clear text is held to a constant value, as long as the PWC entries are different. Consequently, if D<32Q where all of the entries in D are of a constant value, it is possible given a 32 different letter password sequence (ASCII value modulo 32) for the encrypted output to not be repeated. For example, a value of N=31,623 will encode over 1,000,000,000 bytes in a non repetitive fashion. If the factor of 32 is employed, then this is increased to 32 billion. Thus Q can be smaller than the length of an original clear text D of constant value without having the output encoding sequence repeat.

By inspection of the cipher text, it is difficult to determine the size of the masking arrays used because multiple passes through the permutation sequence Q using the same encoding mask arrays but with different password control values can give the same result as when a larger mask array length is used with only one set of password control variables.

Referring to FIG. 6A, another variation would be to use the values for initializing COUNTER #1, 56, and COUNTER #2, 57, that are smaller than N (the length a each masking array). In this case separate variable registers are created with values used for loading the COUNTERS #1 and #2. The new variable would feed the counters 26 and 27 as shown in FIGS. 4A and 4B. The effect is to increment the password array counter before Q combinations have occurred. This creates another variable that an eavesdropper would have to decipher for successful decoding.

Yet another variation utilizes different length entries into the COUNTER #1 and #2. The different lengths can be derived from other counters, not shown, or other variables, or operations using ADD, XOR, and SUB in any order and/or combination.

Referring to FIG. 6A and 6B, another variation would use non-sequential accessing of each mask array entry. This would be accomplished by use of other counters, operations using ADD, XOR and SUB. Care must be taken to be sure that the resulting address remains within the size of the arrays.

Figure 7:
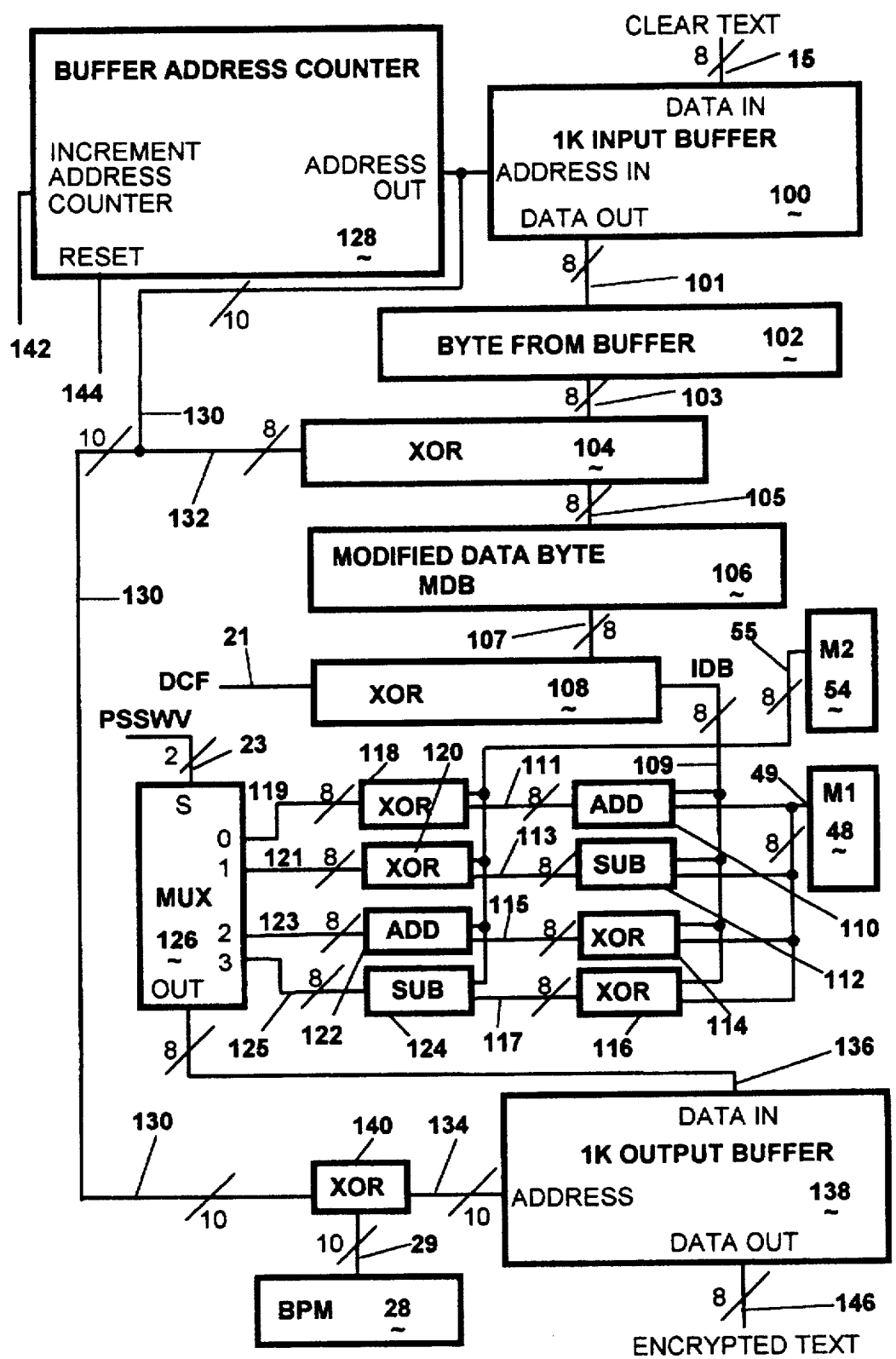
FIG. 7 is a schematic/block diagram of the encoding section.

FIG. 7 shows a functional block diagram/schematic implementation of a preferred encoder. It is assumed that the Mask Arrays have been properly built and that the address register/counters for this arrays have been properly initialized as per the prior discussions.

Still referring to FIG. 7, the elements of the masking arrays MSK1 34 and MSK2 35 are brought up sequentially and modified giving M1 48 and M2 54 according to the prior discussion above. The element M1 48 via 49 is input to four logic/mathematic operation blocks: ADD 110, SUB 112, XOR 114 and XOR 116. The element M2 54 via 55 is input to four logic/mathematic operation blocks: XOR 118, XOR 120, ADD 122, SUB 124. In this preferred embodiment, all data elements are all 8 bit bytes. For the following discussion, assume that PSSWV 23=00, selecting the ADD then XOR (the 110 through 118 path) operation, although a similar discussion applies to the other three operations (PSSWV 23=01, 10, 11). Once the clear text is loaded into a 1024 byte input buffer 100, the buffer address counter 128 is reset to 0 via 144 and buffer sequentially accessed for each byte. The buffer address 130, supplied by the counter/register 128, results in a data byte 101 being extracted from the buffer. This byte 101, stored in 102, and via 103 is then XOR'd 104 with the lower 8 bits of the 10 bit address counter/register 132 to create a Modified Data Byte 105, MDB, which is stored in 106 whose value 107 is further XOR'd. 108 with the DCF 21, Data Complement Flag, to produce an intermediate data byte 108, IDP, which is presented via 109 to each of the four logic/arithmetic operations 110, 112, 114, 116 along with the M1 byte 48 via 49. The result 111 of the ADD 110 goes to a XOR 118 where it is combined with the M2 54 via 55 byte resulting in an input 119 to the multiplexer 126. The M2 48 via 49 byte also goes to each of the other three logic/arithmetic operators (via 120, 122, 124 respectively, resulting in logic/arithmetic outputs 121, 123, 125, respectively which all go the MUX 126. The ADD 110 operation is performed without carries or borrows. The same applies to the other ADD and SUB operations 112, 123, 124 respectively. In the preferred embodiment, the data byte from the MUX 136 goes to the output buffer 138 whose address for this byte is the computed address resulting from the XOR 140 of the BPM 28 via 29 and the Buffer Address Counter/Register 128 via 130. This implementation scrambles the ordinal number sequence from the input buffer 100 to the output buffer 138. It is clear that many other equivalent functions can be performed on the various bytes.

Another implementation, not shown, sends the Encoded Data Byte 136 to the Output Buffer 138 whose address comes directly from the Buffer Address Counter/Register 130 skipping the XOR 140 operation.

Another variation, not shown, is to use the lower eight bits of the XOR of the lower eight bits of BPM 28 and the lower eight bits of Buffer Address Counter/Register 128 to modify the data byte 102 via XOR 104. This can be used with or without any modification of the Buffer Address 130 value going directly to the output buffer 138. Other variations, not shown, along these lines may be employed, so long as the logical inverse is used by the decoding stage. In other preferred embodiments, other variations of the data byte to be encoded/decoded may be provided by using any of: an address counter, an address counter modified by a constant value, an address counter modified by an XOR of a value, an address counter modified by a constant value and XOR'd with a BPM value, or any combination thereof. Another variation, not shown, is to use the lower eight bits of the XOR of the lower eight bits of BPM 28 and the lower eight bits of the Buffer Address Counter/Register to modify the data byte 102 via XOR 104. This can be used with or without any modification of the Buffer Address 130 value to the output buffer 138. Other variations for modifying the buffer address include using: XOR and a BPM value, the addition/subtraction of a constant or any combination of these operation. FIGS. 9 and 10 give general variations for creating the Modified Data Byte, MDB 106, as well as a general variation on the buffer address scrambling techniques.

Figure 8:
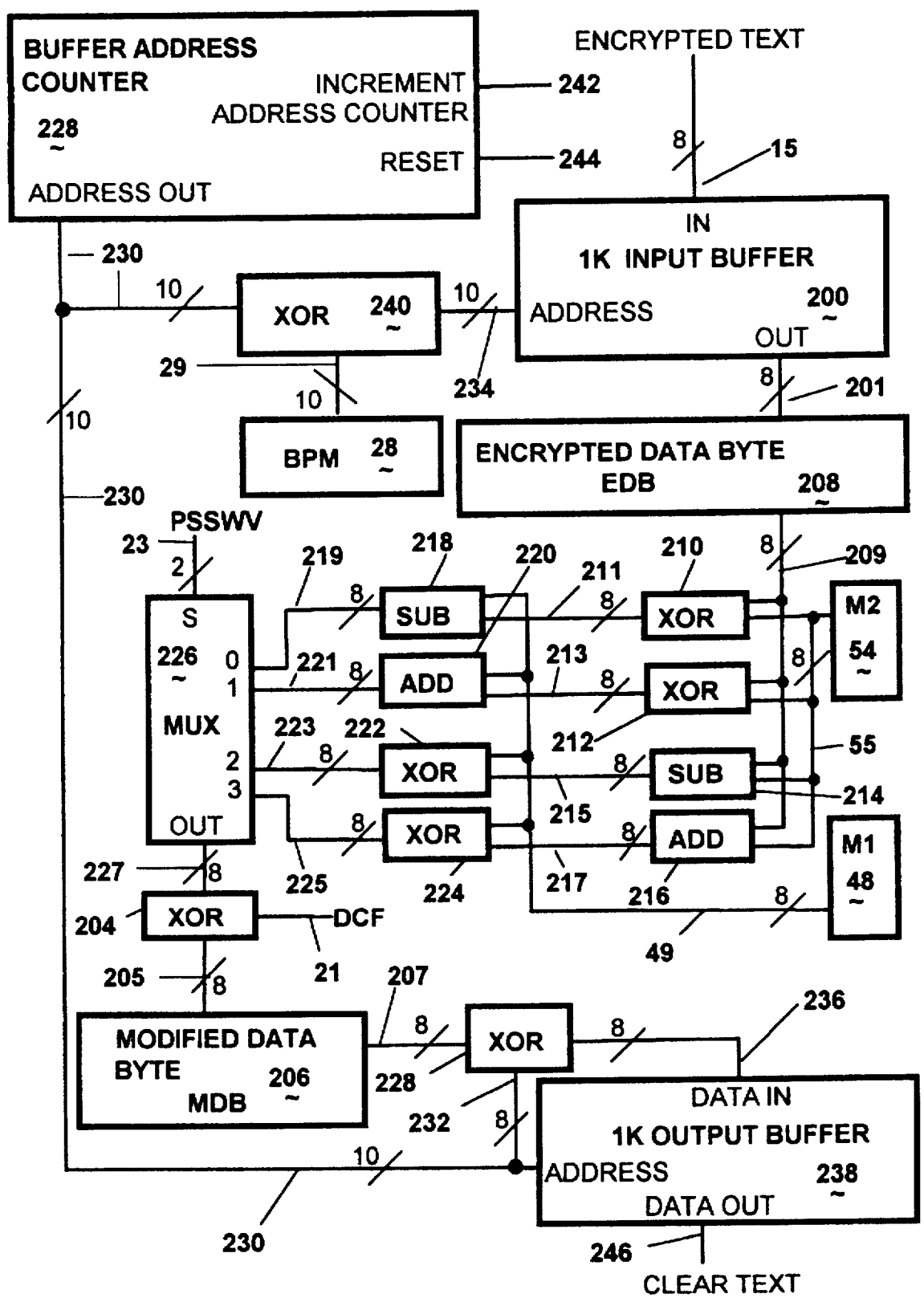
FIG. 8 is a schematic/block diagram of the decoding section.

FIG. 8 shows a decoding functional/block diagram corresponding to the encoder of FIG. 7. Again it is assumed that the Mask Arrays have been properly built and that the address register/counters for this arrays have been properly initialized as per the prior discussions and the input buffer 200 has been filled with previously encrypted data bytes. In this preferred embodiment separate buffer memories, counters and logic blocks are used, although anyone of ordinary skill in the art could implement such a decoding apparatus and method in many different ways using many different or the same components.

Still referring to FIG. 8, the elements of the masking arrays MSK1 34 and MSK2 35 are brought up sequentially and modified giving M1 48 and M2 54 according to the prior discussion above. The element M1 48 is an input via 49 to four logic/mathematic operation blocks: SUB 218, ADD 220, XOR 222, XOR 224. The element M2 54 is an input via 55 to four logic/mathematic operation blocks: XOR 210, XOR 212, SUB 214, ADD 214. In this preferred embodiment, assume that the elements are all 8 bit bytes, and that all four combinations of the input data byte are performed and are inputs to the multiplexer 226. In the preferred embodiment all ADD and SUB operations are performed without borrow or carries. For discussion, assume that PSSWV 23=00, selecting the XOR then SUB (210 through 218 path) operation, although a similar discussion applies to the other three operations (PSSWV 23=01, 10, 11). The Buffer Address Counter/Register 228 is initially set to 0 via 244 and a scrambled Buffer Address 234 is created by taking the XOR 240 of the BPM 28 via 29 value and the output 230 of the Buffer Address Counter 228. This results in our obtaining an Encrypted Data Byte 201, EDB, which is stored in 208. The EDB is then presented via 209 to all four of the logic/mathematic operators XOR 210, XOR 212, SUB 214, ADD 216. Simultaneously the mask byte M2 54 is also presented via 55 to these same operators. The mask byte M1 48 via 49 is similarly presented to the four logic/mathematic operators SUB 218, ADD 220, XOR 222, XOR 224. Now, looking at only the case where PSSWV 23 = 00, the result 211 of the XOR 210 of the EDB 208 via 209 and M2 54 via 55 goes to the SUB 218 where M1 48 via 49 is subtracted from it resulting in an input byte 219 to the MUX 226. The MUX 226 directs the result of these operations to its output 227 where the byte is now XOR'd 204 with an expanded DCF signal giving us 205 a Modified Data Byte, MDB, which is stored in 206. That is, DCF is XOR'd with all eight bits of the output of the MUX 227. The output of the MDB byte 207 is further modified by XORing 228 it with the lower 8 address bits from the Buffer Address Counter/Register 232. The result of this XOR operation 236 is a recovered clear text byte which is now placed in the output buffer 238 addressed directly by the Counter/Register 228 via 230. The same operations apply to the other XOR (212 and 220), SUB (214 and 222) and ADD (216 and 224) operations. The results of these other operations 221,223, 225 respectively, are all supplied to the other inputs 221, 223, 225 of the MUX 226 and are selected by PSSWV 23 having values of 01, 10,11 respectively.

As previously described for FIG. 3A, the control bytes and flags are contained in the password command array 24. In this preferred embodiment DCF 21, CF1 20, CF2 19 are all expanded out to 8 bits. Of course, other implementations may use flags of other widths, where that bit is fed in parallel to all the bits being processed. In another preferred embodiment the operations are performed in software where one bit flags perform the same tasks as discussed above, but where such a flag bit enables some other known byte for, say, XORing.

In a preferred embodiment where the message is to be transmitted via a serial communications channel, the encrypted message text must be sent separately from the ADF and the password used to encrypt the message in order to maintain reasonable security.

Other variations of modifying the data byte to be encoded/decode include using an address counter, an address counter modified by a constant value, an address counter modified by an XOR of a value, an address counter modified by a constant value and XOR'd with a BPM value, or any combination of these procedures.

FIG. 9 illustrates a variation for creating a Modified Data Byte, MDB 106, using various other values, MDB MOD1 300 and MDB MOD2 306, to vary the bit pattern used to create the Modified Data Byte. MDB MOD 1 has the effect of providing a systematic offset to the counter address value 130, while MDB MOD2 306 has the effect of then varying the pattern used to create the MDB. The values for MDB MOD1 and MDB MOD2 could be BPM, ESO or other variables or combinations of variables. The values chosen must be such that they can be reproduced in reverse order for decoding. Decryption employs the reverse of the logic employed for encryption.

FIG. 10 illustrates a general address scrambling scheme for encoding. Here BPM MOD 310 and BPM 28 can be of any value as long as they are reproducible in reverse order for decoding. The output 130 of the buffer address counter 128 is modified by adding 312 the BPM MOD value 310 to it. The BPM MOD value can be a constant, a variable, or any combination of values as long as they may be calculated in reverse order for decoding. The output of the ADD 313 is further XOR'd 140 with the BPM value 28 via 29 resulting in 134 which is a scrambled address going to the output buffer 138.

Other variations not shown replace the ADD 312 with an XOR and the XOR 140 with an ADD. Other combinations of ADD, SUB and XOR may be used in any order or combination in the derivation of the address scrambling sequence.

Figure 11:
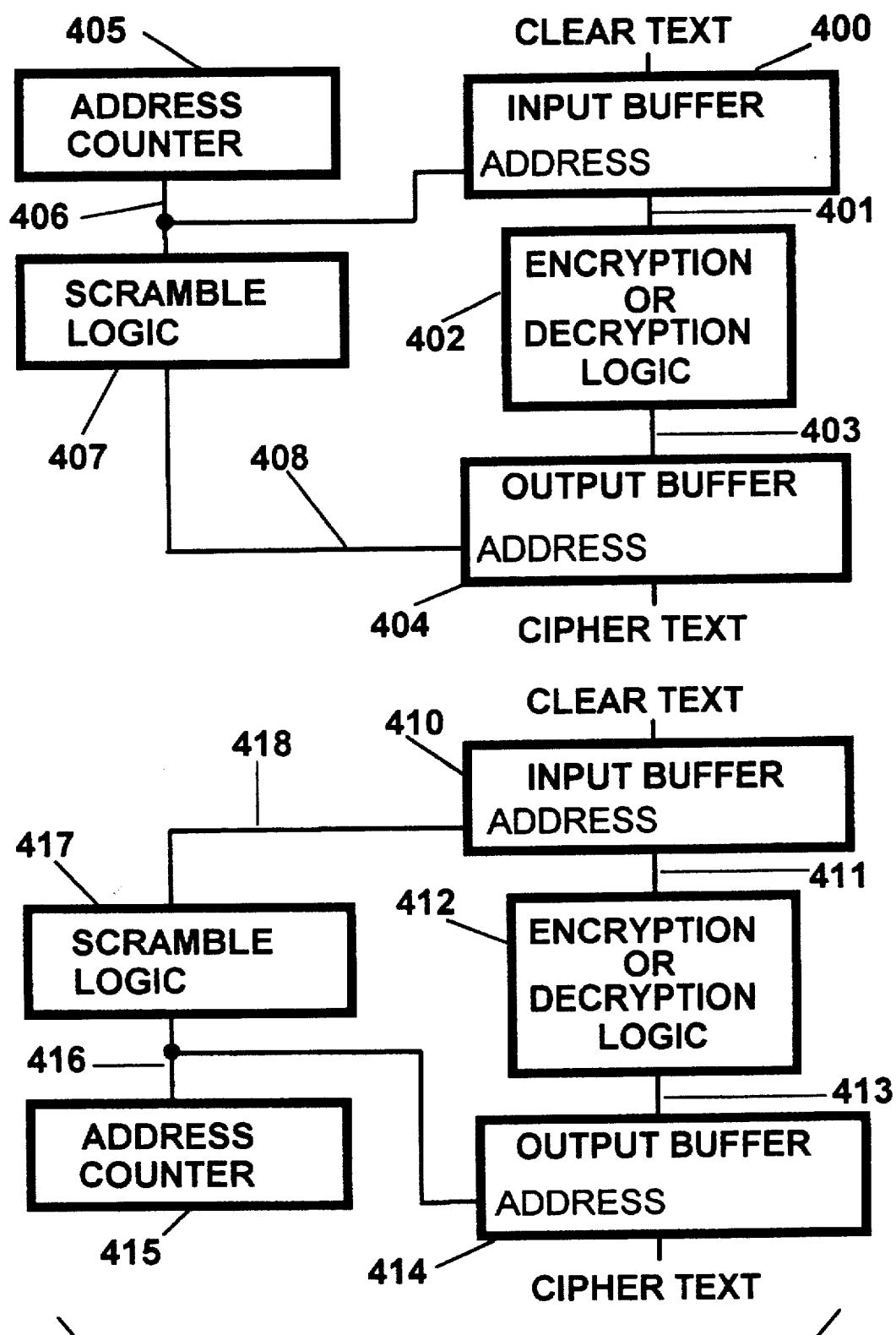
FIG. 11 is a block diagram showing variations on buffer address scrambling.

FIG. 11 shows possible variations on positional address scrambling. Either the top or the bottom diagram may be implemented for encoding while the other diagram would be used for decoding. Assume the input and output buffers 400, 404, 410 and 414 are all a power of 2 in size and assume that the address values 406, 408, 416 and 418 are appropriate to cover the total address space of the buffers. Also assume that the scramble logic provides a modification of the output of the address counter which when modified still covers all possible values of output of the address counter.

Still referring to FIG. 11, discussing the top variation, the sequential output 406 of the address counter 405 goes both to the input buffer 400 and to the scrambling logic 407. The output 408 of the scrambling logic goes to the output buffer 404. The clear text data byte 401 linearly addressed by 406 from the input buffer 400 is given to the encoding logic 402 where its value is modified. The output 403 of the encoding logic 402 is placed into the output buffer 404 in a non linear sequence which is now addressed by the modified address 408. This causes the ordinal position of the output to vary from that of the input. This is the addressing method which is used for both FIG. 7 and FIG. 8.

Still referring to FIG. 11, discussing the bottom variation, the output 416 of the address counter 415 goes to the scramble logic 417 which creates a modified address 418 which causes the input buffer 410 to be sampled in a non linear fashion. The output 411 of the input buffer 410 is given to the encoding logic 412 where its value is modified. The output 413 of the encoding logic is placed into the output buffer 414 in a linear sequential fashion because the address for this buffer 416 comes directly from the address counter 415.

Either of the above methods could be used for encoding while the corresponding opposite method would be used for decoding.

Figure 12:
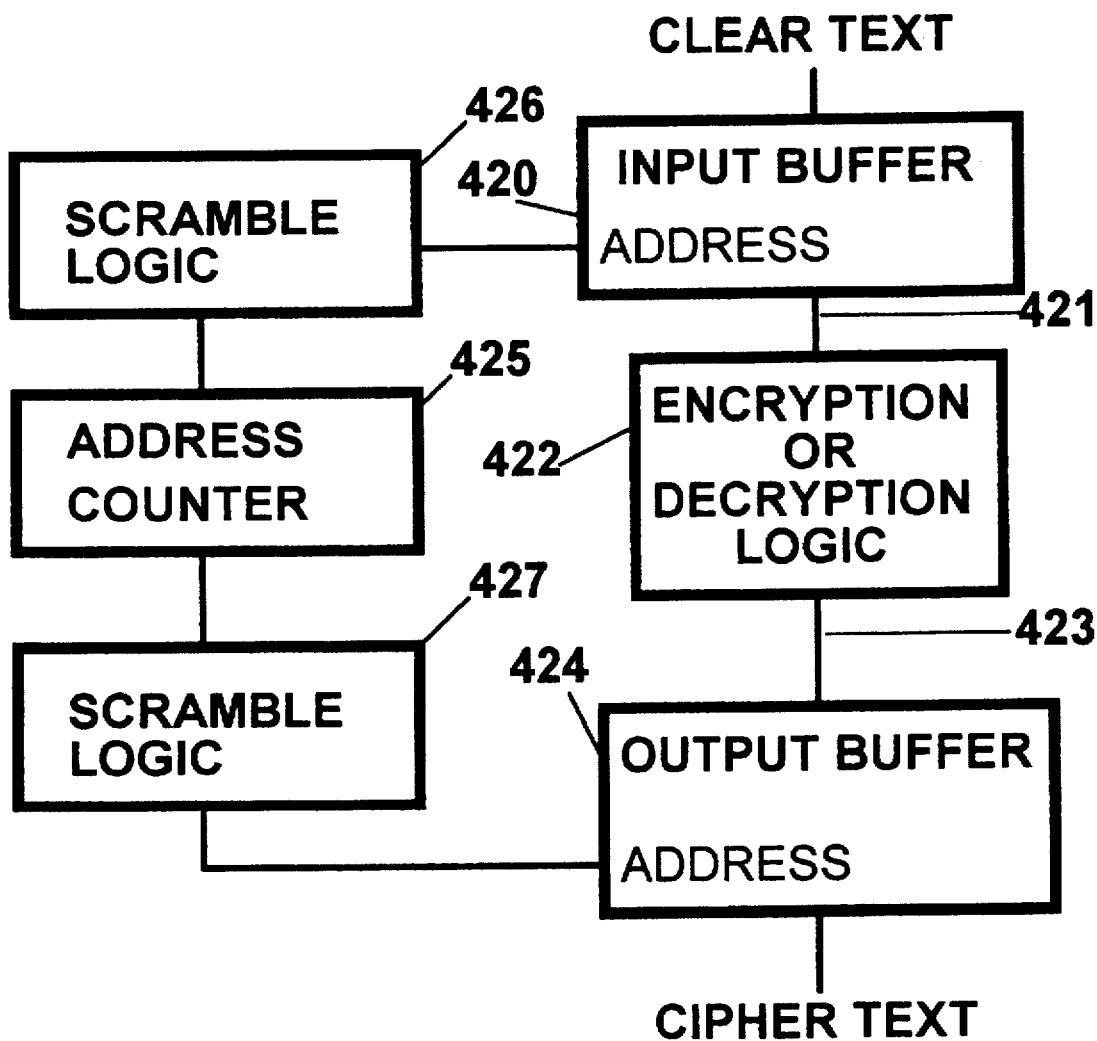
FIG. 12 is another variation of scrambling addresses.

FIG. 12 shows yet another variation of positional address scrambling. In this case, both the input and output sequence will be non-linear. Both sets of scrambling logic, 426 and 427, operate on the output of a serial counter 425 as well as other variable, counters, XOR, ADD, SUB in any order or combination to modify the address value transferred to the input 420 and output 424 buffers. The logical inverse of the modifications employed for encoding must be employed for decoding. Because of address scrambling, complete buffers must be processed. The unused portions of the buffers being processed with randomly selected characters.

Figure 13:
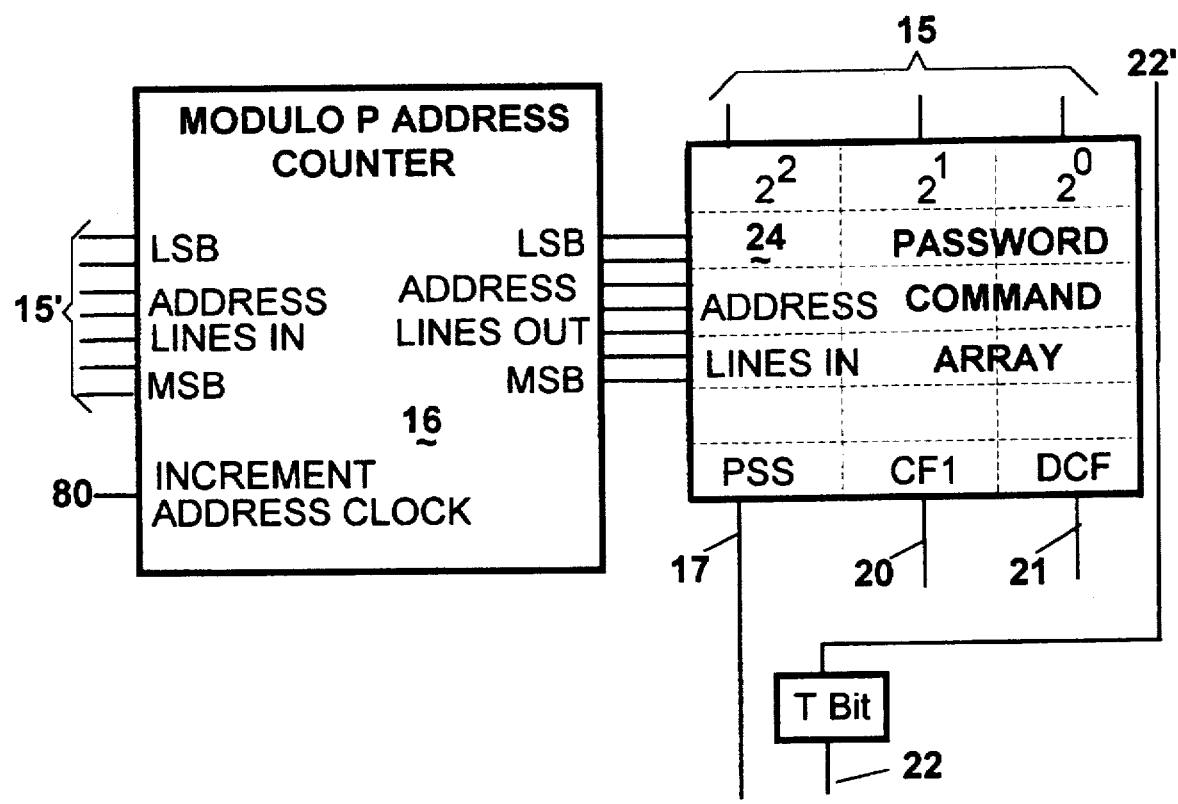
FIG. 13 is a functional block diagram of the password command array of a single mask array embodiment, and showing how the array is accessed to provide the variables used to control the operation of the encoding system.
Figure 14:
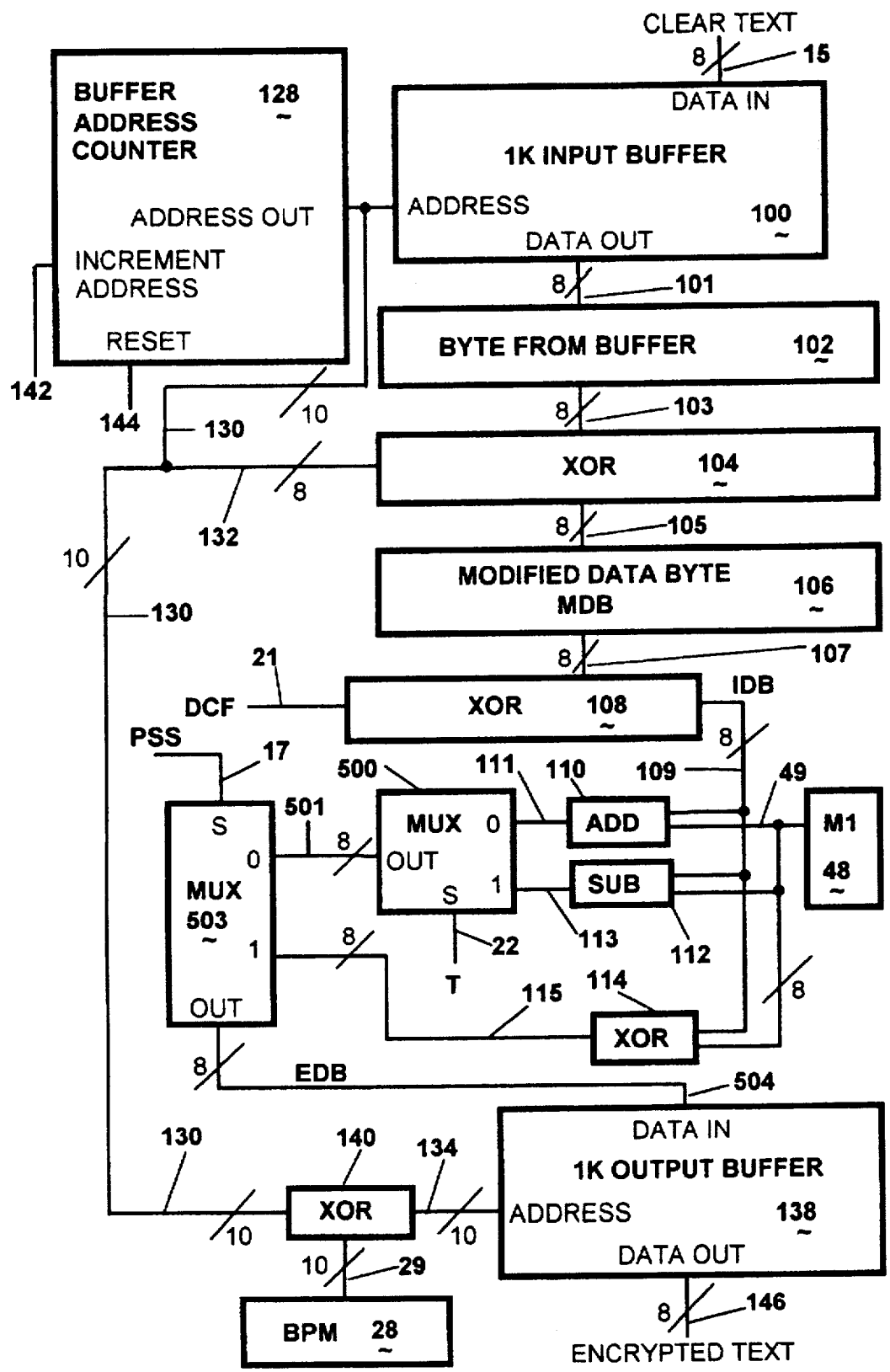
FIG. 14 is a schematic/block diagram of the encoding section using a single mask array.
Figure 15:
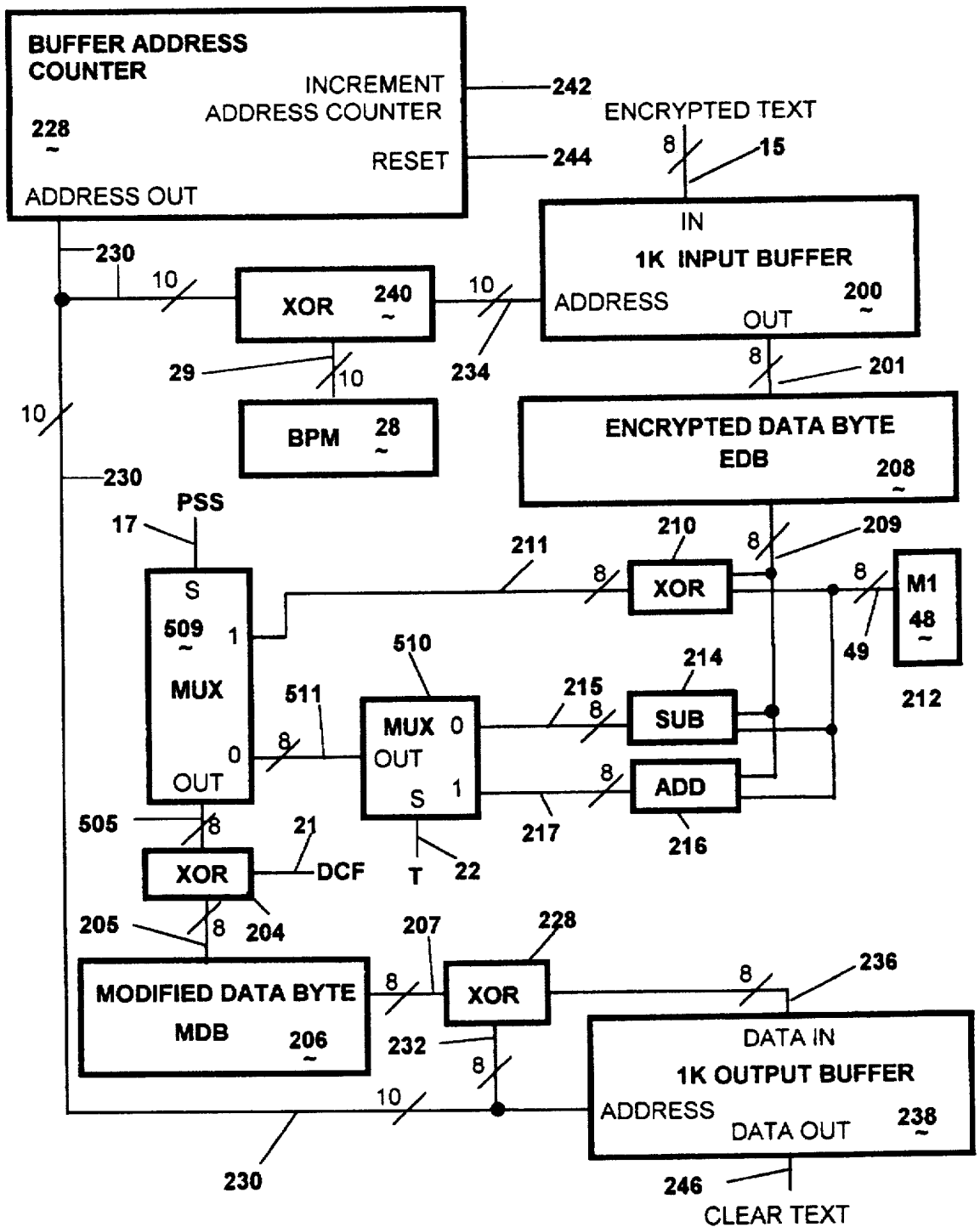
FIG. 15 is a schematic/block diagram of the decoding section using a single mask array.

The case, in which one of the mask arrays is filled with all Zero's, is similar to the use of just a single array mask. FIGS. 13 through 15 show the changes needed in the Password Command Array 24 and the encoding and decoding sections of FIGS. 7 and 8 to implement the single mask array encoding/decoding scheme.

FIG. 13 shows a diminished Password Command Array 24 where the entries for Data Swap Flag, DSF, 18 and Complement Flag #2 ,CF2, 19 are eliminated. As a result of this elimination, the maximal non repetitive length of Q is now 8N (ignoring the MDB operation and having a constant input data value). Again the T Bit 22 is used to select XOR/ADD or XOR/SUB combination as in prior discussions. The logic for addressing and accessing the first (now only) mask array FIG. 4A is still used, though the user might want to implement a change allowing for values less than or equal to N to be entered into counter #1 (array length counter) 36 so that the Password Command Array is updated more frequently than each N times allowing for the introduction of another encoding variable. This variable has the effect of causing discontinuities in our masking values sequence. The first half of FIG. 6A will be kept to initialize the mask array address counter, while the steps 68 to the end of FIG. 6B will be replace by only step 80. The left half of FIG. 5 will be kept from item 45 through 49. The output of MSK1 34 will now go directly to 45 instead of through MUX 44. Thus when COUNTER #1 is decremented to zero, it is now reset to the user supplied value or N and the Password Command Array address 24 is incremented via 80. All of the modifications and variations discussed in FIGS. 9 through 12 may also be employed with FIG. 14 and FIG. 15.

FIG. 14 shows a functional block diagram/schematic implementation of a single mask array encoder. It is assumed that the mask array has been properly built and that all address register/counters for the array have been properly initialized. XOR logic elements 114 and 116 have been combined into just 114. The elements of the single masking army MSK1 34 are brought up sequentially and modified giving M1 according to prior discussions. The element 48 via 49 is input to the three logic/mathematic operations blocks: ADD 110, SUB 112 and XOR 114. For this example, all data elements are 8 bits wide and all ADD's and SUB's are implemented without carries or borrows. For discussion assume PSS=0 and T Bit=0 giving the ADD operation. A similar applies to the SUB operation (PSS=0, T Bit=1). As previously discuss in FIG. 7, the input buffer is addressed, a data byte is removed, modified by a counter assembly to create a modified data byte, MDB, which is further modified by the flag DCF 21 to create the Intermediate Data Bye, IDB, 108. The IDB, via 109 goes to all three logic/ mathematic elements ADD 110, SUB 112 and XOR 114 where it is combined with M1 48 via 49. The output of the ADD 11 goes to a new MUX 500 (selected by T Bit 22) whose output 501 goes to another two input MUX 503 (which replaces MUX 126) whose output 504 (which is now the Encrypted Data Byte, EDB) goes to the output buffer 138. Because of the use of just one array and one modification operation, the significance of the MDB modification and the scrambling of the output sequence (via the BPM and XOR 140) takes on added importance. When PSS=1 then the output 115 of the XOR 114 goes through MUX 503 via 504 to the output buffer 138.

Another implementation, not shown, removes the MUX 500 and changes MUX 503 from a two input to a three input MUX allowing for both ADD and SUB operations as well as the XOR operation to occur at the same time. If this is done then PSS will have to be expanded to 2 bits in the Password Command Array to allow for the selection of three inputs. Care will also be needed in mapping the four possible values of an expanded PSS to the selection of three inputs. It may be helpful to use a four input MUX (similar to 126) and direct one of the operations ADD, SUB or XOR to the additional input (in addition to its normal connection to the MUX). In a similar manner changes would also have to be implemented in the decoding method as shown in FIG. 15.

FIG. 15 shows a decoding functional/block diagram corresponding to the encoder of FIG. 14. Again it is assumed that the Mask Array MSK1 34 has been properly built and that the address register/counters for his array have been properly initialized as per the prior discussions and the input buffer 200 has been filled with previously encrypted data bytes. In this embodiment, separate buffer memories, counters, and logic blocks are used, although anyone of ordinary skill in the art could implement such decoding apparatus and method in many different ways using different or the same components.

Still referring to FIG. 15, the elements of the masking array MSK1 34 are brought up sequentially and modified giving M1 according to the prior discussion above. The elements M1 48 via 49 is an input to three logic/mathematic operation blocks: XOR 210, ADD 214 and SUB 216. In this single mask array embodiment, assume that the elements are all 8 bit bytes, and that all three combinations of the input data are performed and input the multiplexers 510 and 509. Also assume that all ADD and SUB operations are performed without carries or borrows. For discussion, assume PSS=0 and T Bit=0, selecting the SUB operation, though a similar discussion applies to the ADD operation (when T Bit=1). The Buffer Address Counter/Register 228 is initially set to zero via 244 and a Scrambled Buffer Address 234 is created by taking the XOR 240 of the BPM 28 via 29 and the output 230 of the Buffer Address Counter 228. This results in our obtaining an Encrypted Data Byte, EDB, 201 which is stored in 208. The EDB is then present to all three of the logic/mathematic operators: XOR 210, SUB 214 and ADD 216 along with the mask byte M1 48 via 49. Now, looking at the case where PSS=0 and T Bit=0, the result 215 of the SUB 214 goes to a new two input MUX 510 (selected by T Bit=0) whose output 511 goes to another two input MUX 509 (selected by PSS=0) whose output goes to XOR 204 where it is modified by DCF 21. The result 205 is a Modified Data Byte, MDB, which is stored in 206. The unscrambled address 230 for the Output Buffer 238 determines the location for the resultant clear text byte 236. When T bit=1 and PSS=0, the result 217 of the ADD 216 is similarly processed as when T Bit=0. When PSS=1, the result 211 of the XOR 210 of M1 48 via 49 and the EDB 209 goes to the MUX 509 then via 505 to the XOR 204 and is processed as above.

Figure 16:
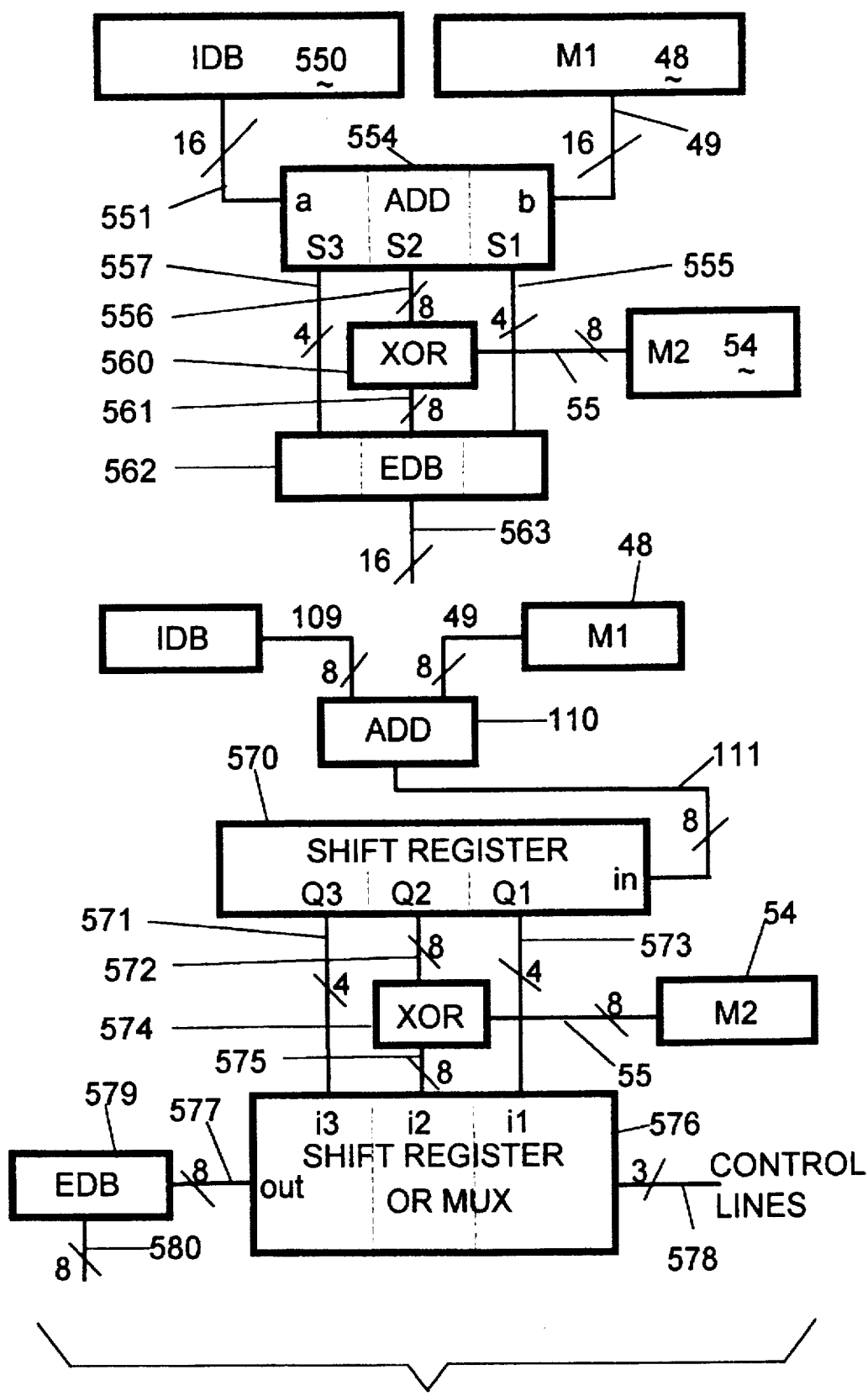
FIG. 16 is a schematic/block diagram of an encoding element using two arrays of different widths and of an encoding element using arrays of the same width but showing modified implementation.

FIG. 16 is a schematic/block diagram of an encoding element using two arrays of different widths (at the top) and of an encoding element using arrays of the same width but showing a modified implementation of logic/mathematic operation (at the bottom).

Still referring to the top of FIG. 16, in this case M1 is 16 bits wide while M2 is only 8 bits wide. The widths of these two masks may be any bit width, and not necessarily a multiple of 8 bits. This is just to show that the encoding (and decoding) do not require the restriction of having the same bit widths for the two masking arrays. The intermediate Data Byte 550 is now 16 bits wide and may be the result of acquiring 16 bits of data from the input buffer or the forming of the 16 bits from two 8 bits data fetches. The IDB 550 via 551 and M1 48 via 49, each 16 bits wide, are added together in a 16 bit adder 554. The top 4 bits (557) and the lower 4 bits (555) of the result of this ADD operation go directly without further modification to the encrypted Data Byte register 562 (keeping their respective locations in the register of top and lower 4 bits). XOR 560 takes the middle 8 bits (556) from the ADD 554 and the M2 input 54 via 55 and creates a modified 8 bits (561) which make up the missing middle 8 bits of the EDB register 562. The output of the EDB register 563 is shown being 16 bits wide, but it could easily be accessed in two 8 bit bytes (MSFL LSH) for placement into an output buffer. This top figure just illustrates one example using ADD and XOR, but other combinations of XOR, ADD and SUB could easily be used.

Now looking at the bottom portion of FIG. 16, the result of two IDB operations (here M1 is the same width as M2) is stored in a 16 bit Shift Register 570. The two operations as shown in this figure are ADD 110, but in another implementation, not shown, could include other logic/mathematic operators. However the 16 bits of IDB are modified, they are stored in Shift Register 570, where similar to the discussion about the top portion of this figure, only a portion of the 16 bits are modified by the XOR 574. This XOR (574) has the effect of modifying the top four bits of the IDB byte (8 bits) in the lower half of 576 and the lower 4 bits in the IDB byte in the upper half of 576. The output 577 of the Shift Register 576 are moved 8 bits at a time to EDB 579 whose output 580 is placed into an output buffer in a normal fashion as per prior discussions.

Another implementation, not shown, spreads the 8 bit value of M2 out over a 16 wide bit space (in any order or grouping) thus now covering all 16 bits of result from the first operation. The bit spaces left by this spreading operation may be filled with 0's, 1's, or a combination of 0's and 1's derived by any of: a counter, a variable, XOR, ADD, SUB in any order or combination. Similar spreading out operations may also be employed with the M1 mask values and the first stage operations. In a more limited case, where only one mask array M is used (instead of two, M1 and M2) this may also be employed if desired. The above discussion is not limited to either 8 or 16 bits logical widths. Any bit width may be used for spreading out the operations across a larger bit space.

One way to implement these various logic/arithmetic variations on XOR, ADD and SUB would be to expand the width of the Password Command Array 24 to allow for more control variables which would either enable or disable these options. Also these options could be controlled by a modified counter sequences or any combination of inputs as chosen by the implementor so long as the control sequences generated can be recovered in an inverse logical order for decoding.

This purpose of the lower part of FIG. 16 is to show logic/mathematic operations across IDB data boundaries. When the M2 logic/mathematic operation is ADD or SUB it is possible for carries and borrows to propagate through the complete width of the result. This complicates for an eavesdropper the determination of the encoding elements and the data by making the result sensitive to the order of process of the modified data values resulting from the first stage of encryption/decryption. It also further complicates decryption by an eavesdropper because the scrambling of the input and/or output sequences can significantly effect the encryption results. Though FIG. 16 shows the XOR's 560 and 574 being smaller in bit width than the ADD's 554 and 570, this need not be the case. They could be of the same widths with similar increases in decoding difficulty.

In summary, the purpose of this FIG. 16 is to show that array masks need not be the same width and that logic/mathematic operations can cut across data element boundaries.

Figure 17:
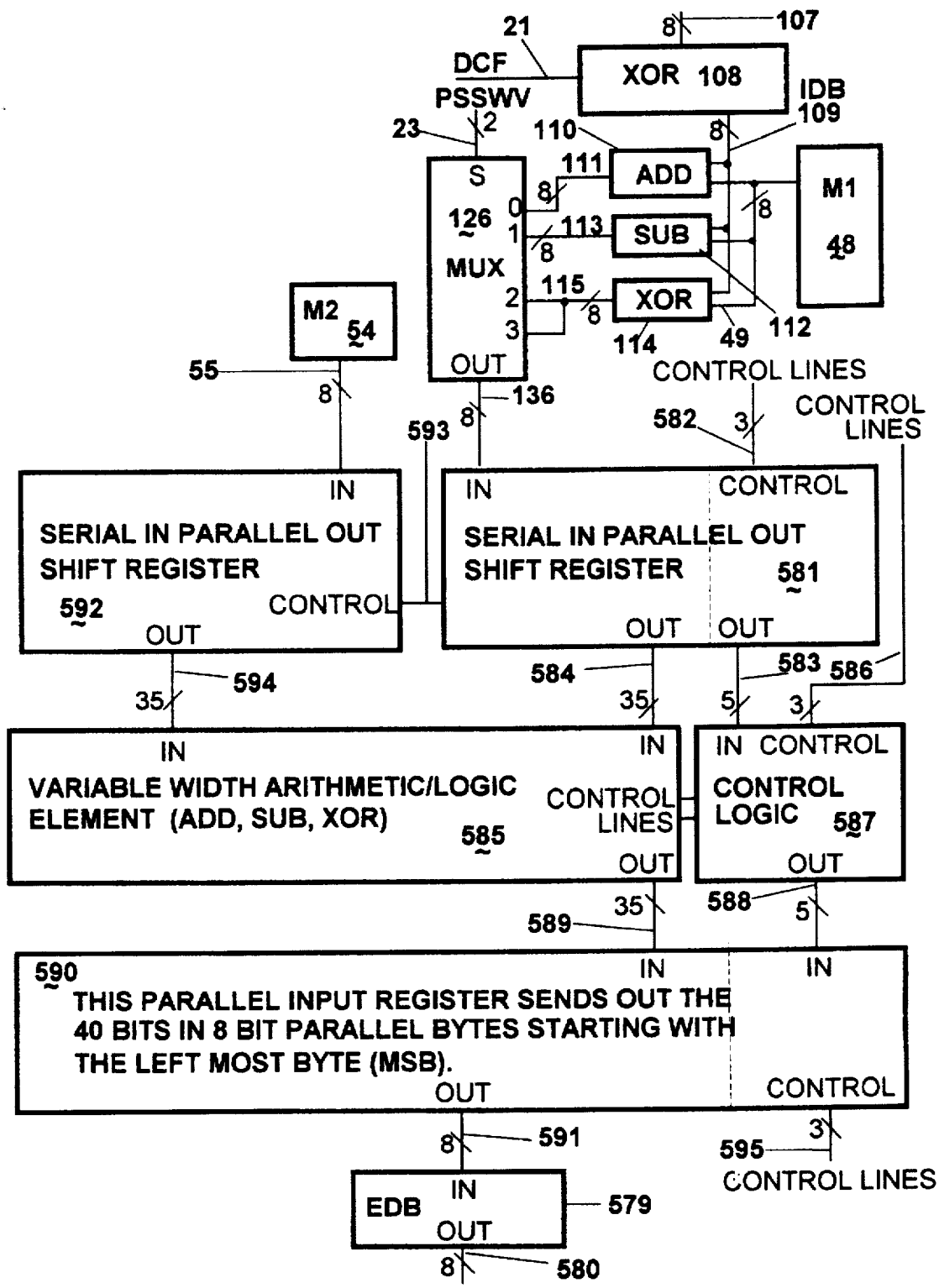
FIG. 17 is a schematic/block diagram of a modified encoding section using a variable width arithmetic/logic element.

FIG. 17 is a schematic/block diagram of a modified encoding section using a variable width arithmetic/logic element. In this figure the variable width element is shown modifying the result of the first data modification using M1 and IDB values, but it could if desired, be constructed to modify this first operation as well, by anyone of ordinary skill in the art. There are two interesting features of FIG. 17 which are worth noting.

Firstly, the second operation occurs over multiple results of previous IDB, M1 logic/mathematic operations. Thus it is possible for the second operation to effect more than one previously encoded data byte. If input and/or output buffer address scrambling is employed, the sequence of occurrence of both the Data bytes and the Mask Array bytes (M1 in this case) become very important. And processing of the correctly encrypted data out of sequence bytes with the correct mask array bytes, will quite probably not produce the correct results. How close the decryption will be to the clear text will be dependent upon the logical/mathematic operators chosen and the data itself.

Secondly, FIG. 17 shows an interesting modification, namely that the lower 5 bits (583) of the modified IDB accumulated in the Shift Register 581 may be used directly or in combination with other values (variables, counters, etc.) to control the varying of the width of operation of the M2 values accumulated in Shift Register 592. This is important because it adds another level of complexity in decoding for an eavesdropper. Besides having to guess the correct data, the correct mask array value, the correct logical/mathematic operators, the correct width of the operation will also have to be guessed. As this width need not be static, it can vary as a result:

1) the Data itself;
2) a logic counter;
3) a character in the password command array 24;
4) a calculated variable;
5) Any combination of the above.

The lower 5 bits 583 normally will be the same as the lower 5 bits 588 going to the Shift Register 590, where the results of the second operation 589 and the 5 bits 588 are stored prior to being shifted via 591 to the EDB register 579 for placement into an output buffer. The reason it is suggested that these bits be placed without modification is that, care must be taken in the modifying of these 5 bits so that information is not lost allowing for correct decoding to take place. If care and forethought are applied, even these 5 bits may be modified and the resulting cipher text decoded by the logical inverse of that used for encoding. The choice to leave 5 bits unchanged is abritrary to this example and other bits widths may be used with this and other schemes. If the choice is made to modify the lower five bits (of this example) then some combination of a counter, variables, XOR, ADD, SUB in any order or combination could be used so long as the control sequences generated to modify these five bits can be recovered in an inverse logical order for decoding.

The complexity of the implementation of the basic logic/mathematic operators XOR, ADD, SUB is only left to the choice of the user. Generally there is a trade off of speed of operation verses complexity, but this also is dependent upon how the implementation is achieved.

All of the variations and modifications shown in FIG. 16 and FIG. 17 may be applied in any order and position within the logical flow to either the single array scheme (FIG. 14 and FIG. 15) or to the two array scheme shown in FIG. 7 and FIG. 8, though these variations in logic do nothing to increase the randomness of the entries in the masking array(s) upon which is security is truly based.

Another preferred embodiment, not shown, utilizes 8 bit data and mask bytes and 32 bit logic/mathematic operations with scrambling of input buffer (8 bit bytes) selections and with scrambling of output buffer (8 bit byte) placement, as previous described. In this implementation, the mask arrays and the input buffer (scrambled) are both sampled four times before any logic/mathematic operations are applied to the resultant 32 bits which when completely processed are places into the output buffer as four separate 8 bit bytes each with a different address. This is slightly different from a direct 32 bit implementation in that it allows for slightly more mask array combinations (given comparable length mask arrays) and makes the processing of the data bytes somewhat sensitive to order.

All the variety of the bit logic implementations do nothing to increase the randomness of the selection key. Therefore all one-time-keys are equally secure regardless of the convolution of logic employed.

The following are examples of one-time-pad implementations in accordance with the present invention.

Let function E(U,V,P) denote encryption of U using file V and password P.

Let function D(U,V,P) denote decryption of file U using File V and password P.

Let C(M,U) denote the overwriting of message M onto the beginning of file U.

Let X(U) denote the recovery (extraction) of a message from file U.

Let T(U) indicate transmitting file U.

Let R(U) indicate the reception of file U.

(note: By using file U it is meant that the elements of the masking arrays are built by sampling file U.)

One version of a one-time-pad scheme is implemented as follows:

Assume that the Parties A and B have agreed ahead of time on a file H to be used to decode the first message. This may be either a specific file, or a method to generate a series of numbers/bytes via a program or a sampling scheme. Also assume that Parties A and B use different passwords, P1 and P2, when sending the messages:

| Party A | Direction | Party B |
| --- | --- | --- |
| W = C(M, large file of random numbers) | | |
| X = E(W,H,P1) | | |
| T(X) | --X--> | R(X) |
| | | W = D(X,H,P1), M = X(W), print M |
| | | new message M |
| | | Y = C(M,X), Z = E(Y,X,P2) |
| R(Z) | <--Z-- | T(Z) |
| Y = D(Z,X,P2), M = X(Y), print M | | |
| new message M | | |
| W1 = C(M,Z), X1 = E(W1,Z,P1) | | |
| T(X1) | --X1--> | R(X1) |
| | | W1 = D(X1,Z,P1), M = C(W1), print M |
| | | new message M |
| | | Y1 = C(M,X1), Z1 = E(Y1,X1,P2) |

| Party A | Direction | Party B |
|---|---|---|
| R(Z1) | <--Z1-- | T(Z1) |
| Y1 = D(Z1,X1,P2), M = X(Y1), print M | | |
| | etc. | |

In the above example the previous message is used to encode and decode the present message though with separate passwords. As noted, each time a message is sent, a different set of mask arrays is used to encode/decode the message. This is the same as using a different "pad" of random numbers for each message though there are several weaknesses with the above, namely:

A) The encoding bytes are always transmitted either along with or before the message (in some fashion).

B) The same encoding scheme is used for both the message and the large array of encoding bytes.

These limitations can be eliminated by using different sampling/encoding schemes for the message and by varying the large array of random numbers. Thus the key array used is not transformed in the same fashion as the message and would truly represent a new collection of numbers. Another limitation is the transmission of the encoding keys with the message. Two other examples are shown below.

First example, assume that parties A and B have communicated ahead of time a method for generating pseudo random numbers, or any numeric sequence and the passwords (P1, P2 and P3) to be employed. This example will use different transforms (passwords) for the message and for the encrypting key arrays:

| Party A | Direction | Party B |
|---|---|---|
| H = locally generated file | | H = locally generated file |
| M = a message to be sent | | |
| Y = E(M,H,P1), T(Y) | --Y--> | R(Y), W0 = D(Y,H,P1) |
| Y2 = E(Y,H,P2) | | M = X(W0), print message M |
| | | New Message M |
| | | Y2 = E(Y,H,P2), W1 = E(M,Y2,P3) |
| | | Z = C(W1,Y) |
| R(Z) | <--Z-- | T(Z) |
| W2 = D(Z,Y2,P3) | | |
| M = X(W2), print message M | | Y3 = E(Y2,H,P2) |
| Y3 = E(Y2,H,P2) | | |
| New Message M, W3 = E(M,Y3,P1) | | |
| Y' = C(W1,Y) | | |
| T(Y') | --Y'--> | R(Y'), W4 = D(Y',Y3,P1) |
| | | M = X(W4), print message M |
| | | New Message M |
| Y4 = E(Y3,H,P2) | | Y4 = E(Y3,H,P2) |
| | | W5 = E(M,Y4,P3) |
| | etc. | |

In the above example, the initial Key is generated locally by both Parties A and B and was not sent between them. After that, the parties each generate locally updated version of the Keys (y2, y3, y4 ,etc.) and no key information is ever sent because they are both using the same internal transforms for creating new encryption keys.

Second Example, assume that parties A and B have communicated ahead of time on a method for generating pseudo random numbers, or any numeric sequence, or a digital source to be read by both parties and the passwords (P1 and P2) to be employed:

| Party A | Direction | Party B |
|---|---|---|
| H = locally generated file | | H = locally generated file |
| [each Y is a collection of random numbers to be used to encode or decode messages] | | |
| Z = E(Y,H,P1), T(Z) | --Z--> | R(Z), Y = D(Z,H,P1) |
| | Note: | Y = a FAKE MESSAGE used later |
| | Note: | as a key. Also Y was sent |
| | Note: | in a scrambled fashion. |
| R(F1) | <--F1-- | T(F1) (FAKE MESSAGE) |
| F2 = FAKE MESSAGE, T(F2) | --F2--> | R(F2) (FAKE MESSAGE) |
| R(F3) | <--F3-- | T(F3) (FAKE MESSAGE) |
| Real Message M | | |
| Z' = E(M,Y,P2), T(Z') | --Z'--> | R(Z'), W = D(Z',Y,P2), M = X(Z') |
| | | Print real Message M |
| | etc. | |

In the above example the encoding/decoding bytes Y were encoded in a fake message, Z, and are not transmitted along with any real messages. Also, the parties used different passwords for the real messages.

The schemes and strategies to be employed are only limited by the imagination of the sender and the receiver and with thought and planning, true one-time pad encoded messages may be easily created with this invention given the vast amount of digital information to choose from as sources for our sampling scheme. The security of this invention lies not in the security of the logic/mathematic operations utilized (though that may help), but rather it lies in the obscurity of the keys and passwords employed.

Other variations of the foregoing Examples and uses are possible.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. Encryption and decryption apparatus comprising:

means for retrieving information to be encoded, said information defining an array D of elements, a first mask array of elements M1 and an independent second mask array of elements M2, wherein said elements M1 and M2 are arranged for logically combining with the array D elements, a password array of P elements, wherein the P elements are arranged to provide a guide to and information for directing and controlling said encryption, an encoder that encodes the array of elements D in accordance with said password information, where the encoder includes means for performing a first operation on the elements D, taking one element at a time, and the elements M1, forming an intermediate array of elements R, and where the encoder performs a second operation on the elements R, taking one element at a time, using the elements, whose results form an encoded message, where said first and second operations are determined and directed from said password information, means for accessing the encoded message, and a decoder that recreates the original message from the encoded message in accordance with said password information, where the decoder performs the logical inverse of the encoder no recreate the original message.

2. Encryption apparatus as defined in claim 1 where the first operation is an "exclusive oring" and the second operation is "adding" and where the corresponding logical inverse of "adding" is "subtracting" and the corresponding logical inverse of "exclusive oring" is "exclusive oring."

3. Encryption apparatus as defined in claim 1 where the first operation is an "adding" and the second operation is "exclusive oring", and where the corresponding logical inverse of "adding" is "subtracting" and the corresponding logical inverse of "exclusive oring" is "exclusive oring."

4. Encryption apparatus as defined in claim 1 where the first operation is an "exclusive oring" and the second operation is "subtracting", and where the corresponding logical inverse of "subtracting" is "adding" and the corresponding logical inverse of "exclusive oring" is "exclusive oring."

5. Encryption apparatus as defined in claim 1 where the first operation is an "subtracting" and the second operation is "exclusive oring", and where the corresponding logical inverse of "subtracting" is "adding" and the corresponding logical inverse of "exclusive oring" is "exclusive oring."

6. Encryption apparatus as defined in claim 1 where the first operation is an "adding" and the second operation is "subtracting", and where the corresponding logical inverse of "adding" is "subtracting" and the corresponding logical inverse of "subtracting" is "adding."

7. Encryption apparatus as defined in claim 1 where the first operation is an "subtracting" and the second operation is "adding", and where the corresponding logical inverse of "subtracting" is "adding" and the corresponding logical inverse of "adding" is "subtracting."

8. Encryption apparatus as defined in claim 1 where the first and second operation is an "adding" and the corresponding logical inverse is "subtracting".

9. Encryption apparatus as defined in claim 1 where the first and second operation is "subtracting" and the corresponding logical inverse is "adding".

10. Encryption apparatus as defined in claim 1 where the first and second operation is "exclusive oring" and the corresponding logical inverse is "exclusive oring."

11. Encryption apparatus as defined in claim 1 further comprising an array combinational counter, consisting of one or more counters, that counts the number of mask array combinations used during encoding and decoding.

12. Encryption apparatus as defined in claim 11 where values smaller than the number of mask array combinations are used to control encoding and decoding.

13. Encryption apparatus as defined in claim 1 further comprising a counter arranged and constructed to modify the ordinal sequence of the encoded information before sending said encoded message, and to perform the logical counter inverse on the received encoded message.

14. Encryption apparatus as defined in claim 13 further comprising: a set of values arranged to modify the counter, such modification including at least one of "adding", "subtracting" or "exclusive Oring" to modify the ordinal sequence of the encoded information before sending said encoded information, and to perform the logical inverse on the received encoded message.

15. Encryption apparatus as defined in claim 1 further comprising a counter arranged and constructed to modify the elements of the array D prior to encoding as defined in claim 1, where said modification increases the dispersion or evenness of the resulting encoded message across the range of possible values of encoded bytes and to perform the logical inverse on the received encoded message.

16. Encryption apparatus as defined in claim 15 further comprising a set of values arranged to modify the counter, and wherein said counter comprises a sequential counter, and where said modification of the counter includes at least one of "adding", "subtracting" or "exclusive oring" with said values to modify the information prior to encoding, where said modification increases the dispersion or evenness of the resulting encoded message across the range of possible values of encoded bytes, and to perform the logical inverse on the received encoded message.

17. Encryption apparatus as defined in claim 1 comprising a counter arranged and constructed to modify the sequence of the information before the information is encoded, and to perform the logical inverse on the received encoded message.

18. Encryption apparatus as defined in claim 17 further comprising: a set of values arranged to modify the counter, such modification including at least one of "adding", "subtracting" or "exclusive oring" to modify the sequence of the encoded information before sending said encoded information, and to perform the logical inverse on the received encoded message.

19. Encryption apparatus as defined in claim 1 further comprising a first counter arranged and constructed using "adding", "subtracting" or "exclusive oring" to produce a scrambled input address for sampling the input buffer prior to encoding and a second counter arranged and constructed using "adding", "subtracting" or "exclusive oring" to produce a scrambled address for placement of the encoded information in an output buffer, and to perform the logical inverse on the received encoded message.

20. Encryption apparatus as defined in claim 1 wherein the mask array elements M1 and M2 are selected from any reproducible digital source.

21. Apparatus as defined in claim 1 wherein said password is an array of bits comprising:
bits that determine the encoding and decoding order of operations,
bits that determine the order of using the elements in each said mask array M1 and M2,
bits that complement the mask bits,
bits that determine starting offsets in said masks, and
bits that determine parity.

22. Apparatus as defined in claim 1 wherein the two mask arrays are accessed independently and in a non linear fashion determined by any combination of: serial counters, variables, "exclusive or", addition, and subtraction operations in any order or combination.

23. Apparatus as defined in claim 1 further comprising at least a first and a second counter, where the first counter output selects the elements of the first mask array and the second counter output selects the elements of the second mask array.

24. Apparatus as defined in claim 1 further comprising at least a first and a second address register, each said register output forming the address to select the elements of the first mask array and the second address register forming the address to select the elements of the second mask array, and
means to load and increment said registers such that the output of each register forms a nonlinear sequence.

25. Apparatus as defined in claim 24 comprising: a set of constants, other counters, in any order that are used to modify the contents of the address registers at different times such that the address register output forms a nonlinear sequence.

26. Apparatus as defined in claim 1 further comprising one or more additional mask arrays wherein each additional array contents is used by the means for encoding to modify the result of the operation with the preceding mask array.

27. Encryption as defined in claim 1 where each of the masking arrays both reside as elements of a single array.

28. A method for encrypting and decrypting messages comprising the steps of:
retrieving an array D of elements to be encoded,
defining a mask array of elements M, wherein said elements M are arranged for logically combining with the array D elements,
creating a password array of P elements, wherein the P elements are arranged to provide a guide to and information for encryption,
encoding the array of elements D in accordance with said password information,
where the encoding includes performing an operation of the elements D, taking one element at a time, and the elements M, forming an encoded message, said operation as directed by said password information,
accessing the encoded message, and
decoding the accessed encoded message to recreates the original message in accordance with said password information,
where the decoding performs the logical inverse of the encoding.

29. Encryption method as defined in claim 28 where the operation is a "subtracting", and where the corresponding logical inverse of "subtracting" is "adding".

30. Encryption method as defined in claim 28 where the operation is an "adding", and where the corresponding logical inverse of "adding" is "subtracting".

31. Encryption method as defined in claim 28 where the operation is a "exclusive oring", and where the corresponding logical inverse of "exclusive oring" is "exclusive oring".

32. Encryption method as defined in claim 28 further comprising the steps of directing the encoder to perform combinations of operations in sequence and the decoder to perform the corresponding combinations of logical inverse operation to recreate the original message, and deriving said combination of operations from the contents of the password.

33. Encryption method as defined in claim 28 further comprising the steps of modifying the sequence of the encoded information before sending said encoded message, and performing the logical inverse of the modification on the received encoded message.

34. Encryption method as defined in claim 33 wherein said modifying step includes at least one of the of "adding", "subtracting", or 'exclusive oring" with constants or other variables to modify the sequence of the encoded information before sending said encoded message.

35. Encryption method as defined in claim 28 further comprising the step of modifying the elements of the array D prior to encoding, where said modification increases the dispersion or evenness of the resulting encoded message across the range of possible values of encoded bytes.

36. Encryption method as defined in claim 35 wherein the modifying step includes at least one of "adding", "subtracting" or "exclusive oring" of constants or other variables to modify the elements of the array D prior to encoding, where said modification increases the dispersion or evenness of the resulting encoded message across the range of possible values of encoded bytes.

37. Encryption method as defined in claim 28 further comprising the step of modifying the sequence prior to encoding by at least one of adding", "subtracting" or 'exclusive oring" of constants or other variables.

38. Encryption method as defined in claim 37 wherein the modifying step includes at least one of "adding", "subtracting" or 'exclusive oring" of constants or other variables to modify the ordinal sequence prior to encoding, where said modification increases the dispersion or evenness of the resulting encoded message across the range of possible values of encoded bytes.

39. A method as defined in claim 28 further comprising the step of accessing the elements of mask array M in a first non-linear fashion.

40. A method as defined in claim 39 where the said nonlinear fashion is determined by any combination of operations in any order or combination, including use of serial counters, and variables combined by "adding", subtracting", and "exclusive oring'.

41. A method as defined in claim 28 including the step of selecting the mask array elements M from any reproducible digital source.

42. A method as defined in claim 28 further comprising the steps of counting the number of mask array combinations or elements used during encoding and decoding.

43. The method as defined in claim 28 further comprising the sampling of the elements of M more than once and in more than one place in the array M, and, counting the elements of mask M used during encoding or decoding.

44. An encryption method comprising the steps of:

accessing a binary file in a bit stream fashion, N bits at a time, converting these N bits to a series of digits in a number base, converting these digits into printable letters, transmitting these printable letters, and performing the inverse of the preceding steps in reverse order to recover the message.

45. Apparatus as defined in claim 28 further comprising the counting of the elements of the mask array M used during encoding and decoding.

46. Apparatus as defined in claim 1 further comprising the use of variable width logic/mathematic operations elements for encoding and decoding.

47. Apparatus as defined in 46 having a wider bit width than the data to be processed for encoding and decoding, said wider width allowing for operations from one byte to modify the result of operations in other bytes.

48. The method as defined in claim 28 further comprising the use of variable width logic/mathematic operations elements for encoding and decoding.

49. The method as defined in 48 having a wider bit width than the data to be processed for encoding and decoding, said wider width allowing for operations from one byte to modify the result of operations in other bytes.

50. Apparatus as defined in claim 1 comprising the use of two or more mask arrays M1, M2, etc., of different bit width.

51. Apparatus as defined in claim 1 comprising the use of fixed width logic/mathematic operations elements having a wider bit width than the data to be processed for encoding and decoding, said wider width allowing for operations from one byte to modify the result of operations in other bytes.

52. Apparatus as defined in claim 51 where the fixed width is wider than the mask array widths and the mask array entries may be spread out across a wider bit distance.

53. The method as defined in claim 28 comprising the use of fixed width logic/mathematic operations elements having a wider bit width than the data to be processed for encoding and decoding, said wider width allowing for operations from one byte to modify the result of operations in other bytes.

54. The method as defined in claim 53 where the fixed width is wider than the mask array widths and the mask array entry may be spread out across a wider bit distance.

* * * * *